(12) United States Patent  (10) Patent No.: US 8,611,602 B2
Jin et al.  (45) Date of Patent: Dec. 17, 2013

(54) ROBUST VIDEO STABILIZATION

(75) Inventors: Hailin Jin, San Jose, CA (US); Aseem O. Agarwala, Seattle, WA (US); Jue Wang, Kenmore, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/368,284

(22) Filed: Feb. 7, 2012

(65) Prior Publication Data

US 2013/0128064 A1 May 23, 2013

Related U.S. Application Data

(63) Continuation of application No. 13/301,572, filed on Nov. 21, 2011.

(60) Provisional application No. 61/473,354, filed on Apr. 8, 2011.

(51) Int. Cl.
G06K 9/00 (2006.01)
G06K 9/40 (2006.01)

(52) U.S. Cl.
USPC .......................................... 382/103; 382/264

(58) Field of Classification Search
None
See application file for complete search history.

(56) References Cited

U.S. PATENT DOCUMENTS

| 8,102,428 B2 * | 1/2012 | Agarwala et al. .......... 348/208.3 |
| 2005/0275727 A1 | 12/2005 | Lai et al. |
| 2007/0009034 A1 | 1/2007 | Tulkki |
| 2008/0112642 A1 | 5/2008 | Matsushita et al. |
| 2008/0165280 A1 | 7/2008 | Deever et al. |
| 2009/0214078 A1 * | 8/2009 | Kuo ............................ 382/103 |
| 2009/0278921 A1 | 11/2009 | Wilson |
| 2009/0295930 A1 | 12/2009 | Deng |
| 2010/0046624 A1 | 2/2010 | Archibald et al. |
| 2010/0053347 A1 | 3/2010 | Agarwala |
| 2010/0208086 A1 | 8/2010 | Kothandaraman et al. |
| 2011/0085049 A1 | 4/2011 | Dolgin et al. |
| 2011/0150093 A1 | 6/2011 | Mangiat et al. |
| 2012/0120264 A1 | 5/2012 | Lee et al. |
| 2012/0162452 A1 | 6/2012 | Liu |
| 2012/0162454 A1 | 6/2012 | Park et al. |
| 2013/0002814 A1 | 1/2013 | Park et al. |
| 2013/0120600 A1 | 5/2013 | Jin |
| 2013/0128062 A1 | 5/2013 | Jin |

(Continued)

OTHER PUBLICATIONS

U.S. Appl. No. 12/954,445, filed Nov. 24, 2010, Adobe Systems Incorporated, all pages.
Zhang, G., Hua, W., Qin, X., Shao, Y., and Bao, H. 2009. Video stabilization based on a 3d perspective camera model. The Visual Computer 25, 11, 997-1008.
Singular value decomposition, downloaded from http://en.wikipedia.org/wiki/Singualr_value_decomposition[Nov. 29, 2010 10:47:04 AM] on Nov. 29, 2010, 14 pages.

(Continued)

Primary Examiner — Randolph I Chu
(74) Attorney, Agent, or Firm — Wolfe-SBMC

(57) ABSTRACT

Methods and apparatus for robust video stabilization. A video stabilization technique applies a feature tracking technique to an input video sequence to generate feature trajectories. The technique applies a video partitioning technique to segment the input video sequence into factorization windows and transition windows. The technique smoothes the trajectories in each of the windows, in sequence. For factorization windows, a subspace-based optimization technique may be used. For transition windows, a direct track optimization technique that uses a similarity motion model may be used. The technique then determines and applies warping models to the frames in the video sequence. In at least some embodiments, the warping models may include a content-preserving warping model, a homography model, a similarity transform model, and a whole-frame translation model. The warped frames may then be cropped according to a cropping technique.

20 Claims, 11 Drawing Sheets

(56) References Cited

U.S. PATENT DOCUMENTS

| | | |
|---|---|---|
| 2013/0128063 A1 | 5/2013 | Jin |
| 2013/0128065 A1 | 5/2013 | Jin |
| 2013/0128066 A1 | 5/2013 | Jin |
| 2013/0148738 A1 | 6/2013 | Chouly |

OTHER PUBLICATIONS

Bhat, P., Zitnick, C. L., Snavely, N., Agarwala, A., Agrawala, M., Cohen, M., Curless, B., and Kang, S. B. 2007. Using photographs to enhance videos of a static scene. In Rendering Techniques 2007: 18th Eurographics Workshop on Rendering, 327-338.

Brand, M. 2002. Incremental singular value decomposition of uncertain data with missing values. In 7th European Conference on Computer Vision (ECCV 2002), 707-720.

Buchanan, A. M., and Fitzgibbon, A. 2005. Damped Newton algorithms for matrix factorization with missing data. In IEEE Computer Society Conference on Computer Vision and Pattern Recognition, 316-322.

Buehler, C., Bosse, M., and McMillan, L. 2001. Non-metric image-based rendering for video stabilization. In 2001 Conference on Computer Vision and Pattern Recognition (CVPR 2001), 609-614.

Igarashi, et al. "As-Rigid-As-Possible Shape Manipulation" ACM Transactions on Graphics 2005.

Chen, B.-Y., Lee, K.-Y., Huang, W.-T., and Lin, J.-S. 2008. Capturing intention-based full-frame video stabilization. Computer Graphics Forum 27, 7, 1805-1814.

Chen, P. 2008. Optimization algorithms on subspaces: Revisiting missing data problem in low-rank matrix. Int. J. Comput. Vision 80, 1, 125-142.

Davison, A. J., Reid, I. D., Molton, N. D., and Stasse, O. 2007. MonoSLAM: Real-time single camera SLAM. IEEE Transactions on Pattern Analysis and Machine Intelligence 26, 6, 1052-1067.

Fitzgibbon, A., Wexler, Y., and Zisserman, A. 2005. Image-based rendering using image-based priors. International Journal of Computer Vision 63, 2 (Jul.), 141-151.

Avidan, et al. "Seam Carving for Content-Aware Image Resizing" ACM Transactions on Graphics 2007.

Goh, A., and Vidal, R. 2007. Segmenting motions of different types by unsupervised manifold clustering. In IEEE Computer Vision and Pattern Recognition (CVPR), 1-6.

Irani, M. 2002. Multi-frame correspondence estimation using subspace constraints. International Journal of Computer Vision 48, 1, 39-51.

Lee, J., and Shin, S. Y. 2002. General construction of time domain filters for orientation data. IEEE Transactions on Visualization and Computer Graphics 8, 2 (Apr.-Jun.), 119-128.

Lee, K.-Y., Chuang, Y.-Y., Chen, B.-Y., and Ouhyoung, M. 2009. Video stabilization using robust feature trajectories. In IEEE ICCV.

Liu, F., Gleicher, M., Jin, H., and Agarwala, A. 2009. Content-preserving warps for 3d video stabilization. ACM Transactions on Graphics (Proceedings of SIGGRAPH 2009) 28, 3 (Aug.), Article No. 44.

Matsushita, Y., Ofek, E., GE, W., Tang, X., and Shum, H.-Y. 2006. Full-frame video stabilization with motion inpainting. IEEE Transactions on Pattern Analysis and Machine Intelligence 28, 7, 1150-1163.

Morimoto, C., and Chellappa, R. 1997. Evaluation of image stabilization algorithms. In DARPA Image Understanding Workshop DARPA97, 295-302.

Nister, D., Naroditsky, O., and Bergen, J. 2004. Visual odometry. In IEEE Computer Vision and Pattern Recognition (CVPR), 652-659.

Shi, J., and Tomasi, C. 1994. Good features to track. In IEEE Conference on Computer Vision and Pattern Recognition, 593-600.

Sinha, S., Frahm, J.-M., Pollefeys, M., and Genc, Y. 2006. Gpu-based video feature tracking and matching. In Workshop on Edge Computing Using New Commodity Architectures (EDGE 2006).

Tomasi, C., and Kanade, T. 1992. Shape and motion from image streams under orthography: a factorization method. Int. J. Comput. Vision 9, 2, 137-154.

Torr, P. H. S., Fitzgibbon, A. W., and Zisserman, A. 1999. The problem of degeneracy in structure and motion recovery from uncalibrated image sequences. International Journal of Computer Vision 32, 1, 27-44.

Vidal, R., Tron, R., and Hartley, R. 2008. Multiframe motion segmentation with missing data using power factorization and gpca. Int. J. Comput. Vision 79, 1, 85-105.

Gal, et al. "Feature-aware Texturing" School of Computer Science, Tel Aviv University, Israel; Draft version. The original paper appeared in EGSR '06 Proceedings.

U.S. Appl. No. 12/953,703, filed Nov. 24, 2010, Adobe Systems Incorporated, all pages.

Bruce D. Lucas and Takeo Kanade. An Iterative Image Registration Technique with an Application to Stereo Vision. International Joint Conference on Artificial Intelligence, pp. 674-679, 1981.

Jianbo Shi and Carlo Tomasi. Good Features to Track. IEEE Conference on Computer Vision and Pattern Recognition, pp. 593-600, 1994.

Shiratori, T., Matsushita, Y., Kang, S.B., and Tang, X. 2006. Video completion by motion field transfer. Proceedings of CVPR 2006 (Jan.).

Feng Liu, Michael Gleicher, Jue Wang, Hailin Jin and Aseem Agarwala. Subspace Video Stabilization. ACM Trans Graphics, 30, 1, Article No. 4, 2011, 10 pages.

Agarwala, A., Dontcheva, M., Agrawala, M., Drucker, S., Colburn, A., Curless, B., Salesin, D., and Cohen, M. 2004. Interactive digital photomontage. ACM Transactions on Graphics (TOG) (Jan.).

Wexler, Y., Shechtman, E., and Irani, M. 2007. Space-time completion of video. IEEE Transactions on Pattern Analysis and Machine Intelligence 29 (Dec.), 1-14.

Agarwala, A., Hertzmann, A., Salesin, D., and Seitz, S. 2004. Keyframe-based tracking for rotoscoping and animation. SIGGRAPH '04: SIGGRAPH 2004 Papers (Aug.).

Barnes, C., Shechtman, E., Finkelstein, A., and Goldman, D. 2009. Patchmatch: a randomized correspondence algorithm for structural image editing. ACM Transactions on Graphics 28, 3, 2.

Jain, V., and Narayanan, P. 2006. Video completion for indoor scenes. Computer Vision, Graphics and Image Processing: 5th Indian Conference, Icvgip 2006, Madurai, India, Dec. 13-16, 2006, Proceedings, 409.

Jia, Y., Hu, S., and Martin, R. 2005. Video completion using tracking and fragment merging. The Visual Computer 21, 8, 601-610.

Ke, Q., and Kanade, T. 2001. A subspace approach to layer extraction. IEEE Computer Society Conference on Computer Vision and Pattern Recognition 1.

Kokaram, A., Collis, B., and Robinson, S. 2003. A Bayesian framework for recursive object removal in movie post production. IEEE International Conference on Image Processing, Barcelona.

Lucas, B., and Kanade, T. 1981. An iterative image registration technique with an application to stereo vision. International joint conference on artificial Intelligence (IJCIA) . . . (Jan.).

Perez, P., Gangnet, M., and Blake, A. 2003. Poisson image editing. ACM Transactions on Graphics (Jan.).

Shih, T., Tang, N., Yeh, W., Chen, T., and Lee, W. 2006. Video inpainting and implant via diversified temporal continuations. Proceedings of the 14th annual ACM international conference on Multimedia, 136.

U.S. Appl. No. 13/301,572, filed Nov. 21, 2011, Adobe Systems Incorporated, all pages.

Tomasi, et al., "Shape and Motion form Image Streams under Orthography: a Factorization Method", *International Journal of Computer Vision*, 9:2, (Nov. 1992), pp. 137-154.

"Non-Final Office Action", U.S. Appl. No. 13/301,572, (Oct. 1, 2013), 7 pages.

"Non-Final Office Action", U.S. Appl. No. 13/368,282, (Oct. 3, 2013), 10 pages.

\* cited by examiner

ROBUST VIDEO STABILIZATION

PRIORITY INFORMATION

This application is a continuation of U.S. patent application Ser. No. 13/301,572 filed Nov. 21, 2011, which claims benefit of priority of U.S. Provisional Application Ser. No. 61/473,354 filed Apr. 8, 2011, the content of which is incorporated by reference herein in its entirety.

BACKGROUND

Description of the Related Art

One of the most obvious differences between professional and amateur level video is the quality of camera motion; hand-held amateur video is typically shaky and undirected, while professionals use careful planning and equipment such as dollies or steadicams to achieve directed motion. Such hardware is impractical for many situations, so video stabilization software is a widely used and important tool for improving casual video.

Conventional techniques for software video stabilization follow two main approaches, and tend to provide either high quality or robustness and efficiency. These two approaches are two-dimensional (2-D) video stabilization and three-dimensional (3-D) video stabilization.

2-D Video Stabilization

One conventional approach to software video stabilization is 2-D stabilization, which is widely implemented in commercial software. This approach applies 2-D motion models, such as affine or projective transforms, to each video frame. Though conventional 2-D stabilization tends to be robust and fast, the amount of stabilization it can provide is very limited because the motion model is too weak; it cannot account for the parallax induced by 3-D camera motion.

Conventional two-dimensional video stabilization techniques work by estimating a 2-D motion model (such as an affine or projective transform) between consecutive frames, computing new motions that remove high-frequency jitter, and applying per-frame warps to achieve the new motion. Standard 2-D stabilization is robust and efficient, but can only achieve limited smoothing, since 2-D warps cannot account for the parallax induced by a moving camera. While some conventional 2-D methods have attempted more aggressive smoothing, for example by carefully planned interpolation in a transform space or directly optimizing long trajectories, the inability to accommodate parallax fundamentally limits the amount of smoothing possible.

3-D Video Stabilization

In contrast to conventional 2-D video stabilization techniques, conventional 3-D video stabilization techniques may perform much stronger stabilization, and may even simulate 3-D motions such as linear camera paths. In this approach, a 3-D model of the scene and camera motion are reconstructed using structure-from-motion (SFM) techniques, and then novel views are rendered from a new, smooth 3-D camera path. However, a problem with 3-D stabilization is the opposite of 2-D: the motion model is too complex to compute quickly and robustly. SFM is a fundamentally difficult problem, and the generality of conventional solutions is limited when applied to the diverse camera motions of amateur-level video. In general, requiring 3-D reconstruction hinders the practicality of the 3-D stabilization pipeline.

Conventional three-dimensional video stabilization typically begins by computing a 3-D model of the input camera motion and scene. Image-based rendering techniques can then be used to render novel views from new camera paths for videos of static scenes. Dynamic scenes are more challenging, however, since blending multiple frames may cause ghosting. In some conventional techniques, ghosting may be reduced or avoided by fitting a homography to each frame; however, this approach cannot handle parallax.

Content-Preserving Warps

Content-preserving warps, or content-aware warps, have been introduced as a non-physically-realistic approach to rendering the appearance of new camera paths for dynamic scenes. A content-preserving warp is content-aware in that it attempts to maintain as much as possible the original characteristics of the objects in the scene that are most likely to be noticeable to a viewer. In this method, the reconstructed 3-D point cloud is projected to both the input and output cameras, producing a sparse set of displacements that guide a spatially-varying warping technique.

While 3-D stabilization techniques can achieve high quality camera motions through extremely stabilized 3-D camera paths, their practicality is limited by the need to perform 3-D reconstruction through structure-from-motion (SFM). There are fundamental issues that make a robust, efficient and general solution to the SFM problem challenging. The problem is inherently non-linear and often has ambiguities, so most conventional methods make restrictive assumptions about the input and/or resort to large-scale non-linear optimization. SFM has issues with robustness and generality, as some videos simply do not contain sufficient motion information to allow for reconstruction. Efficiency may also be a problem, since SFM typically requires global non-linear optimization. Most conventional SFM implementations are not streamable (i.e., they require random access to the entire video rather than just a window surrounding the current frame) since they need to perform multiple iterations of optimization. Some real-time SFM systems have been demonstrated; however, these all require a calibrated video camera. Also, these conventional systems focus on camera motion recovery rather than scene reconstruction, and thus yield very sparse 3-D reconstruction, which might not yield enough information for 3-D video stabilization.

SUMMARY

Various embodiments of methods, apparatus, and computer-readable storage media for robust video stabilization are described. Given an input video sequence, the robust video stabilization technique applies a feature tracking technique to the video to generate feature trajectories. U.S. patent application Ser. No. 12/953,703 describes a feature tracking technique that may be used in some embodiments. Note that other techniques may be used in some embodiments of the robust video stabilization technique to track features.

The robust video stabilization technique may apply a video partitioning technique to segment the input video sequence into one or more factorization windows and one or more transition windows. At least some embodiments may use a conservative factorization approach to partition the video into overlapping windows. The transition windows may be extended to overlap adjacent windows.

After the input video is segmented into factorization windows and transition windows, the robust video stabilization technique may smooth the trajectories in each of the windows, in sequence. For factorization window trajectory smoothing, a subspace-based optimization technique may be used to smooth the tracks while respecting the boundary constraints from the previous window. For transition window trajectory smoothing, a direct track optimization technique that uses a similarity motion model may be used.

After all of the windows are processed to smooth the feature trajectories, the robust video stabilization technique may determine and apply warping models to the frames in the video sequence. In at least some embodiments, a warping score is determined for each frame in the video sequence, and a warping model is determined according to the warping score of the frame. The technique may adjust the warping score for a frame according to the scores of adjacent or nearby frames to help achieve a smoother transition between frames. In at least some embodiments, the warping models may include a content-preserving warping model, a homography model, and a similarity transform model.

After warping all of the frames in the video sequence, the robust video stabilization technique may crop all of the frames to generate an output video. In at least some embodiments, a cropping technique may be used that places all frames into respective canvases, finds maximum possible cropping windows for all frames, forms an array of the anchor points (e.g., centers) of the cropping windows, and temporally smoothes the array. The cropping windows are then adjusted according to the smoothed anchor points.

While the various techniques described above may be used in combination in a robust video stabilization technique as described herein, these techniques may be used, alone or in combination, in other video stabilization techniques. For example, the techniques for stabilizing factorization windows may be used in the subspace video stabilization technique described in patent application Ser. No. 12/953,703. As another example, the technique for determining and applying warping models may be applied in the subspace video stabilization technique described in patent application Ser. No. 12/953,703 or in other video stabilization techniques to apply warping to frames. As yet another example, the cropping technique may be applied in the subspace video stabilization technique described in patent application Ser. No. 12/953,703 or in other video stabilization techniques to crop warped frames.

Figure 1:
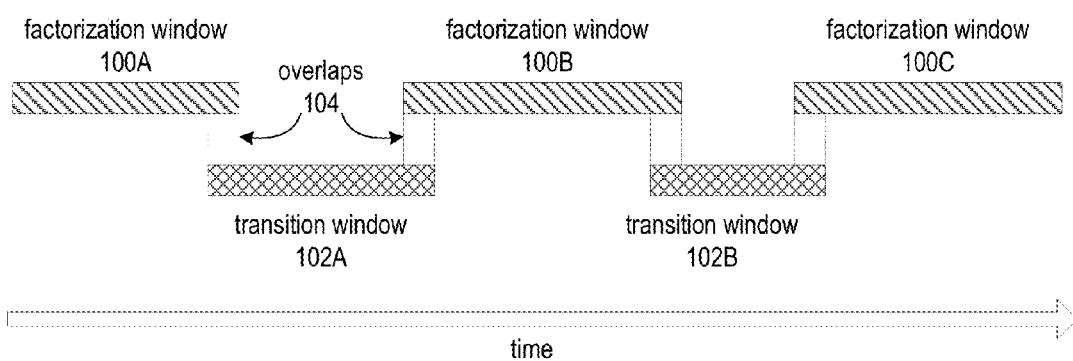
FIG. 1 illustrates an input video sequence divided into two types of overlapping windows, referred to as factorization windows and transition windows, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for robust video stabilization are described. A subspace video stabilization technique is described in U.S. patent application Ser. No. 12/953,703, entitled "Methods and Apparatus for Subspace Video Stabilization," filed Nov. 24, 2010, the content of which is incorporated by reference herein in its entirety. The subspace video stabilization technique described in patent application Ser. No. 12/953,703 may provide an approach to video stabilization that achieves high-quality camera motion for a relatively wide range of videos. The subspace video stabilization technique may transform a set of input two-dimensional (2-D) motion trajectories so that they are both smooth and resemble visually plausible views of the imaged scene; this may be achieved by enforcing subspace constraints on feature trajectories while smoothing them. The subspace video stabilization technique may assemble tracked features in the video into a trajectory matrix, factor the trajectory matrix into two low-rank matrices, and perform filtering or curve fitting in a low-dimensional linear space. The subspace video stabilization technique may employ a moving factorization technique that is both efficient and streamable to perform the factorization. In at least some embodiments, the moving factorization technique may factor two-dimensional (2D) feature trajectories from an input video sequence into a coefficient matrix representing features in the input video sequence and basis vectors representing camera motion over time in the input video sequence. The coefficient matrix may describe each feature as a linear combination of two or more of the basis vectors. The moving factorization technique iteratively: performs factorization in a window of k frames of the input video sequence; moves the window forward δ frames; and performs factorization in the moved window. The parameters k and δ are positive integers, where k is greater than δ so that the factored windows overlap The subspace video stabilization technique described in patent application Ser. No. 12/953,703 tends to work well for carefully-shot, relatively short video sequences that typically yield a relatively large number of long tracks. Tracks are trajectories of feature points in time across frames of the video, and may be referred to herein as tracks, feature tracks, trajectories, or feature trajectories. The length of a track is determined by how many frames the track crosses. However, for difficult examples where the input video was poorly shot with larger camera motions, parts of the video may contain relatively few tracks, and/or relatively short tracks, and thus the subspace video stabilization technique may not produce satisfactory results or may even fail to produce a result at all. The following may be limitations of the subspace video stabilization technique when applied to challenging cases:

The factorization technique as described in patent application Ser. No. 12/953,703 may not always work. The factorization technique requires a relatively large number of long tracks to work well, which may not be the case when the camera is moving too fast or the scene is textureless.

When the factorization technique fails, the subspace video stabilization technique fails completely. No method has previously been provided that allows the subspace video stabilization technique to step back and try a less aggressive approach. In other words, the subspace video stabilization technique does not fail gracefully.

The subspace video stabilization technique applies a low-pass filter to the eigen-trajectories (also referred to as basis vectors) after factorization. However, low-pass filtering may not be sufficient in many cases, especially on enforcing boundary constraints.

Embodiments of a robust video stabilization technique is described herein that may handle more challenging video sequences than can be handled by the subspace video stabilization technique described in patent application Ser. No. 12/953,703 and other conventional video stabilization techniques. Embodiments of the video stabilization technique as described herein are robust and efficient, and provide high quality results over a wider range of videos than previous techniques. When compared to conventional 3-D video stabilization techniques employing structure from motion (SFM) technology, the robust video stabilization techniques described herein are relatively simple and may require no special handling of the known problems in techniques employing SFM, since none of the problems change the subspace properties of motion trajectories on which embodiments of the robust video stabilization technique may rely. Furthermore, embodiments of the robust video stabilization technique may be performed in real-time or near real-time, may use linear approximations to bilinear optimizations for efficiency, and may be computed in a streaming fashion. When compared to the video stabilization techniques described in patent application Ser. No. 12/953,703, the robust video stabilization technique may apply a factorization technique conservatively, and may only apply factorization to parts of an input video sequence where the factorization works well. For the rest of the input video sequence, the robust video stabilization technique may apply a different optimization technique that is more reliable under conditions where there are insufficient tracks to apply the factorization technique. At least some embodiments of the robust video stabilization technique may also allow the user to change the underlying motion model of the stabilization technique, so that for normal examples the robust video stabilization technique may take full advantage of a subspace video stabilization technique to generate high quality results, while for examples of poor quality the robust video stabilization technique may still manage to generate reasonable results using simpler motion models. The robust video stabilization technique may thus work better on more challenging videos to produce more satisfactory results, and may be more controllable, than the video stabilization technique described in patent application Ser. No. 12/953,703 and other conventional video stabilization techniques.

In embodiments of the robust video stabilization technique, an input video sequence may be divided into two types of overlapping windows, referred to as factorization windows and transition windows, as shown in FIG. 1. Each window may include multiple sequential frames from the input video sequence. As shown in FIG. 1, the robust video stabilization technique may decompose an input video sequence to be stabilized into the two types of windows (factorization windows 100 and transition windows 102) for optimization. FIG. 1 shows three factorization windows 100A, 100B, and 100C, and two transition windows 102A and 102B. Transition window 102A includes one or more frames that appear between the end of factorization window 100A and factorization window 100B. Transition window 100A also includes one or more frames that overlap factorization window 100A and one or more frames that overlap factorization window 100B, as indicated by overlaps 104. A factorization window 100 generally contains sufficiently many long feature tracks so that the factorization technique works well. A transition window 102, on the other hand, generally contains fewer long feature tracks than a factorization window 100, and thus the factorization technique may not work as well or at all on a transition window 100. In at least some embodiments, the robust video stabilization technique optimizes the windows sequentially with respect to the time axis. For example, the windows in FIG. 1 may be optimized in this order: factorization window 100A, transition window 102A, factorization window 100B, transition window 102B, factorization window 100C. The overlapping portions between two adjacent windows may allow the robust video stabilization technique to use the previous window to constrain the next window for temporal smoothness, since the transition from one window to the next should be smooth. While FIG. 1 shows transition windows 102 overlapping adjacent factorization windows 100, in at least some embodiments two adjacent factorization windows 100 may overlap in some cases.

Figure 2:
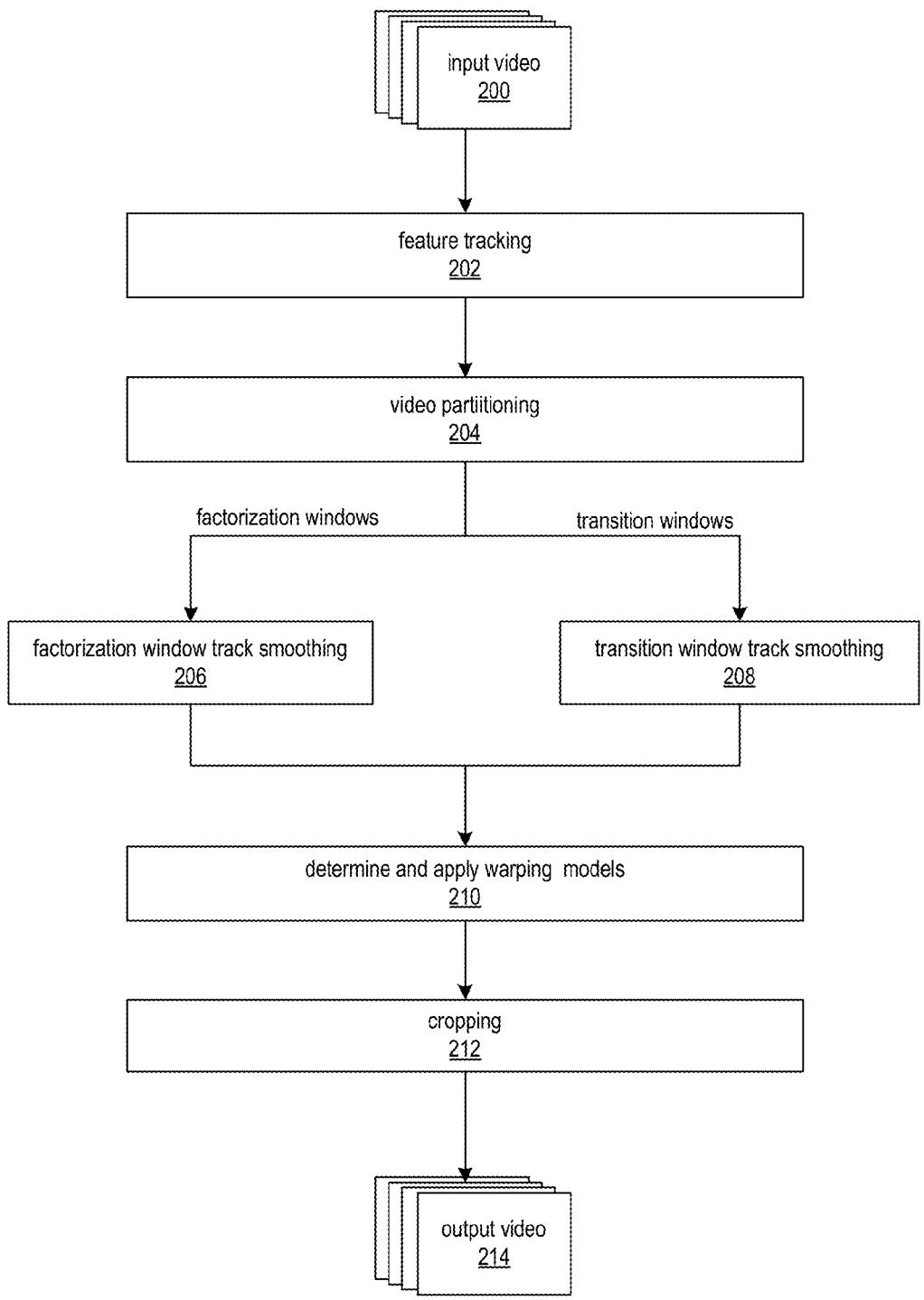
FIG. 2 is a high-level flowchart of the robust video stabilization technique, according to at least some embodiments.

FIG. 2 is a high-level flowchart of the robust video stabilization technique, according to at least some embodiments. Given an input video sequence 200, the robust video stabilization technique applies a feature tracking technique to the video to generate feature trajectories, as indicated at 202. Patent application Ser. No. 12/953,703 describes a feature tracking technique that may be used in some embodiments. Note that other techniques may be used in some embodiments of the robust video stabilization technique to track features.

The robust video stabilization technique then performs video partitioning, as indicated at 204, to segment the input video sequence 200 into one or more factorization windows and one or more transition windows (see FIG. 1). At least some embodiments may use a conservative factorization approach to partition the video into overlapping windows, as described below in the section titled Video partitioning technique. Note that other techniques may be used in some embodiments of the robust video stabilization technique to partition the video.

After the input video is segmented into factorization windows and transition windows, the robust video stabilization technique may smooth the tracks in each of the windows, in sequence, thus alternating between factorization window track smoothing 206 and transition window track smoothing 208 as the windows are stabilized in sequence. At 206, for factorization window track smoothing, a subspace-based optimization technique may be used to smooth the tracks while respecting the boundary constraints from the previous window. A subspace-based optimization technique that may be used at 206 to stabilize factorization windows in at least some embodiments is described below in the section titled Factorization window stabilization techniques. At 208, for transition window track smoothing, a direct track optimization technique that uses a similarity motion model may be used. A direct track optimization technique that may be used at 208 to stabilize transition windows in at least some embodiments is described below in the section titled Transition window stabilization techniques.

After all of the windows are processed at either 206 or 208, the robust video stabilization technique may determine and apply warping models to the frames in the video sequence, as indicated at 210. A technique that may be used at 210 in at least some embodiments is described below in the section titled Determining and applying warping models. In this technique, a warping score is determined for each frame in the video sequence, and a warping model is determined according to the warping score of the frame. The technique may adjust the warping score for a frame according to the scores of adjacent frames to help achieve a smoother transition between frames. Note that other techniques may be used in some embodiments of the robust video stabilization technique to warp the frames.

After warping all of the frames in the video sequence, the robust video stabilization technique may crop all of the frames, as indicated at 212, to generate an output video 214. A technique that may be used at 212 in at least some embodiments to crop the frames is described below in the section titled Cropping technique. Note that other cropping techniques may be used in some embodiments of the robust video stabilization technique.

Each of elements 202 through 212 of the robust video stabilization technique as illustrated in FIG. 2 are explained in more detail below. While elements 202 through 212 are shown in FIG. 2 as being used in combination in a robust video stabilization technique as described herein, these elements may be used, alone or in combination, in other video stabilization techniques. For example, the techniques for stabilizing factorization windows described in the section Factorization window stabilization techniques that may be used at 206 of FIG. 2 may be used in the subspace video stabilization technique described in patent application Ser. No. 12/953,703. As another example, the technique that may be used at 210 described in the section titled Determining and applying warping models may be applied in the subspace video stabilization technique described in patent application Ser. No. 12/953,703 or in other video stabilization techniques to apply warping to frames. As yet another example, the technique that may be used at 212 to crop the frames described in the section titled Cropping technique may be applied in the subspace video stabilization technique described in patent application Ser. No. 12/953,703 or in other video stabilization techniques to crop warped frames.

Feature Tracking

As indicated at 202 of FIG. 2, given an input video sequence, the robust video stabilization technique applies a feature tracking technique to the video to generate feature trajectories. The robust video stabilization technique tracks multiple feature points across the frames of the input video sequence to generate feature trajectories throughout the entire video. A feature tracking technique is applied is to find the locations of the same feature point in a sequence of two or more frames. Trajectories should run as long as possible, and as many feature points as possible should be identified and tracked. In at least some embodiments, Kanade-Lucas-Tomasi (KLT) feature tracker technology may be used as the 2-D feature tracking technique. Other techniques may be used for 2-D feature tracking in other embodiments.

The result of the feature tracking technique is a set of feature trajectories $\{T_i\}$. Each feature trajectory indicates the locations of a respective point in a contiguous series of frames. A feature tracking technique that may be used in some embodiments is further described in patent application Ser. No. 12/953,703. Note that other techniques may be used in some embodiments of the robust video stabilization technique to track features.

Video Partitioning Technique

As indicated at 204 of FIG. 2, after generating the feature trajectories, the robust video stabilization technique performs video partitioning to segment the input video sequence into one or more factorization windows and one or more transition windows (see FIG. 1). A window in this context is a contiguous set of frames. A factorization window may be defined as a set of contiguous frames to which a moving factorization technique, such as the moving factorization technique described in patent application Ser. No. 12/953,703, can be applied. To qualify for a factorization window, the frames must contain at least a minimum number of tracks (feature trajectories) for the factorization technique to be applied. Thus, some embodiments may employ a threshold that specifies a minimum number of tracks. A transition window may be defined as a window to which frames that do not qualify for factorization windows are assigned. A transition window generally lies between two factorization windows, and partially overlaps each adjacent factorization window (see FIG. 1).

In general, the video partitioning technique may favor factorization windows because better stabilization results may be obtained with a technique for stabilizing factorization windows, and thus as many frames as possible should be assigned to factorization windows. Therefore, a partitioning technique may be used that may attempt to find as many factorization windows as possible, with as many frames as possible being assigned to the factorization windows. The remaining frames that are not assigned to the factorization windows are assigned to transition windows.

In at least some embodiments, the following video partitioning technique may be used. Given a contiguous set of frames (e.g., an input video sequence), the technique starts at the beginning of the sequence (e.g., frame 0) and finds the first frame in the sequence at which a moving factorization algorithm can be applied (i.e., the first frame at which there are sufficient feature trajectories to apply the moving factorization algorithm). This frame will be the beginning of the first factorization window. If there are frames before the beginning of the first factorization window, the frames are assigned to a transition window. The frames in the input video sequence after the first frame of the factorization window are then sequentially checked to see if the frames can be assigned to the factorization window. This continues checking frames and adding the frames to the current factorization window as long as there are a sufficient number of feature trajectories (e.g., at or above a specified threshold) to apply the moving factorization algorithm to the frames. When a frame is reached at which the moving factorization algorithm cannot be applied, the checking and adding of frames to the current factorization window stops. In at least some embodiments, a window length threshold may also be applied, and the video partitioning technique may stop adding frames to the current factorization window when the threshold is reached. Thus, the first factorization window includes all frames from the first frame in the window to the last frame added before a terminating condition is met. If there are still frames left in the input video sequence, the video partitioning technique begins again at the first window not already assigned to a factorization window. Again, the frames are checked until a frame that can be factorized is found (i.e., a frame that has a sufficient number of tracks), which is the start of a next factorization window. Any frames between this frame and the previous factorization window are assigned to a transition window, and frames after this frame are sequentially checked to see if the frames can be added to the current factorization window, stopping when a terminating condition is met (e.g., when a frame is found that does not qualify for factorization due to an insufficient number of trajectories, or when a window length threshold is reached). After all frames have been processed and assigned to either factorization windows or transition windows, the transition windows may be expanded to overlap the adjacent factorization windows by one or more frames, for example by 20 frames. See FIG. 1 for an example segmentation of an input video sequence into factorization windows and transition windows that overlap adjacent factorization windows.

Figure 7:
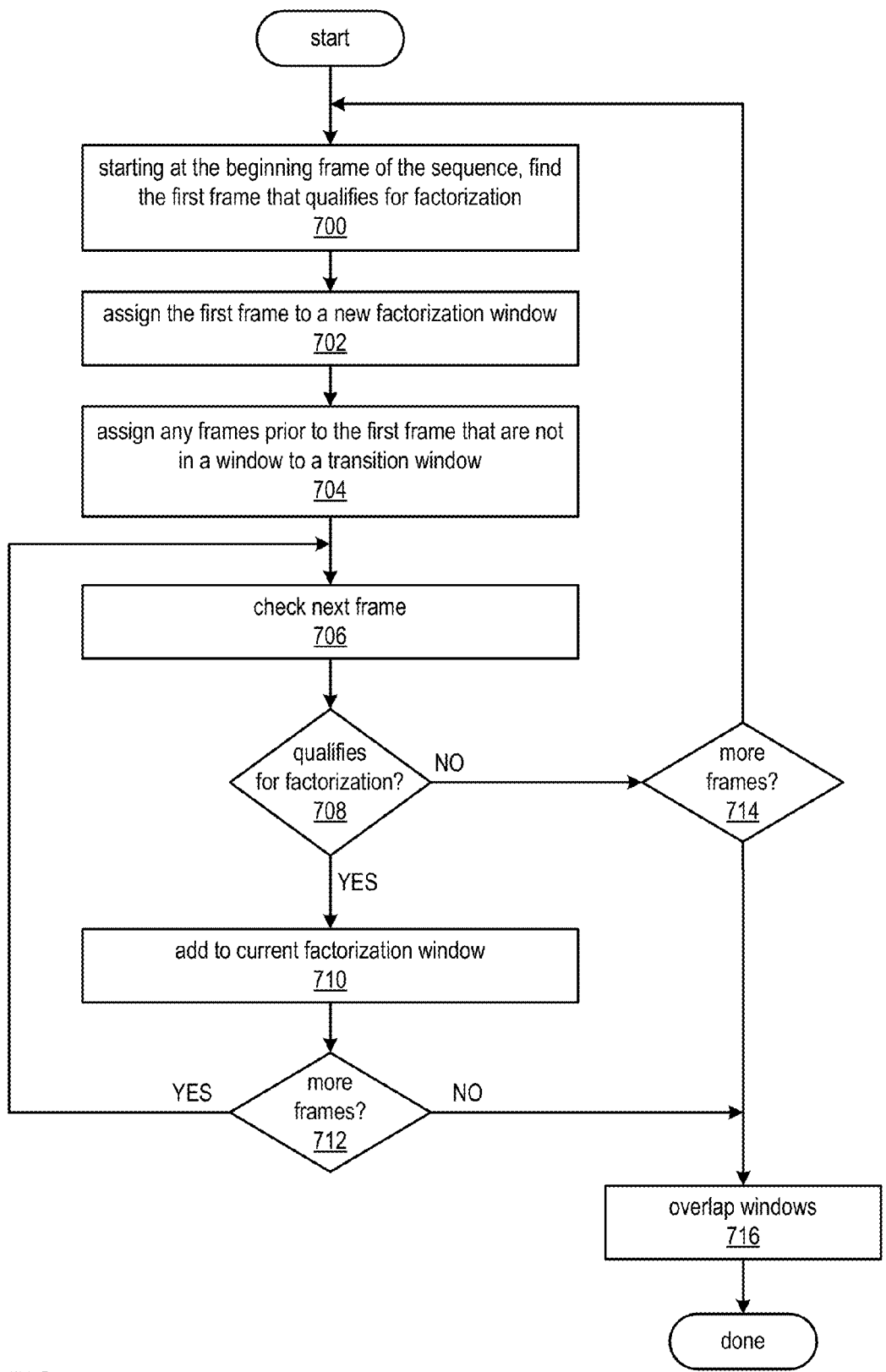
FIG. 7 is a flowchart of a video partitioning technique according to some embodiments.

A flowchart of the video partitioning technique according to some embodiments is shown in FIG. 7. As indicated at 700, starting at the beginning frame of the sequence, the technique finds the first frame that qualifies for factorization. A frame qualifies for factorization if there are sufficient feature trajectories (e.g., above a specified threshold) to apply the moving factorization algorithm. As indicated at 702, the technique assigns the first frame to a new factorization window. As indicated at 704, the technique assigns any frames prior to the first frame that are not in a window to a transition window. As indicated at 706, the next frame is checked. At 708, if this frame qualifies for factorization, the frame is added to the current factorization window, as indicated at 710. At 712, if there are more frames to be processed, the technique returns to element 706. If not, the video partitioning technique proceeds to element 716. In at least some embodiments, a window length threshold may be applied at 712, and the technique may stop adding frames to the current factorization window when the threshold is reached.

At 708, if this frame does not qualify for factorization, the technique checks to see if there are more frames to process, as indicated at 714. If so, the technique returns to element 700. If not, the technique proceeds to element 716.

At 716, the technique may overlap adjacent windows. In at least some embodiments, the transition windows are overlapped with adjacent windows by extending the transition windows to include, on each end for which there is an adjacent window, N frames that are in the adjacent window, for example N=20 frames. In at least some embodiments, only the transition windows are extended; factorization windows are not extended. Thus, in at least some embodiments, the transition windows are extended to overlap the factorization windows.

The basic video partitioning technique described above may work aggressively to assign as many frames as possible to factorization windows. However, in some cases, this basic video partitioning technique is too aggressive as it may result in factorization windows in which there are relatively few good tracks for performing factorization. In at least some of these factorization windows, the factorization algorithm may barely succeed, and the final stabilization results may contain artifacts due to the lack of a sufficient number of good tracks. Therefore, in at least some embodiments, a more conservative video partitioning technique may be used to partition the input video sequence into factorization windows and transition windows. This conservative video partitioning technique may help to insure that the generated factorization windows include sufficient tracks for the factorization algorithm to succeed and to produce final stabilization results with fewer or no artifacts. Using this conservative video partitioning technique, more frames may be assigned to transition windows than with the previously described aggressive technique.

In the conservative video partitioning technique, a factorization window $[t_{start}, t_{end}]$ may be generated using the basic video partitioning technique described above; $t_{start}$ represents the first frame in the window, and $t_{end}$ represents the last frame in the window. For each frame in the window, a quality score may be computed as:

$$Q(t) = \sum_{j} \lambda_{t,j}, \qquad (1)$$

$$t \in [t_{start}, t_{end}]$$

where $\lambda_{t,j}$ refers to the weight for the jth trajectory on frame t, which is used to fade-in and fade-out the contribution of each trajectory over time to preserve temporal coherence. $\lambda_{t,j}$ is only positive when the jth trajectory appears on frame t, otherwise it is zero. A technique that may be used to set this weight is described in relation to FIG. 5 of the published paper *Content-preserving warps for 3D video stabilization*, which appeared in ACM Trans Graphics 28, 3, Article No 44, 2009, the content of which is incorporated by reference herein in its entirety.

Once a quality score is computed for each frame in the window, the conservative video partitioning technique searches for the first frame in the window that has a quality score that is lower than a predefined threshold. If no such frame is found, then the factorization window passes the quality check. Otherwise, suppose on frame t ($t_{start}$<t<$t_{end}$, where < indicates relative position in a temporal sequence) the quality score is lower than the threshold. The conservative video partitioning technique then truncates the factorization window to [$t_{start}$, t−1], and restarts from frame t.

Using this conservative video partitioning technique, only frames with enough good features and trajectories for performing factorization are assigned to the factorization windows.

While the video partitioning techniques as described above partition an input video sequence into two different types of windows, the techniques may be adapted to partition an input video sequence into more than two different types of windows. More than two different video stabilization techniques may then be applied to the different types of windows. In addition, while the video partitioning techniques are described as partitioning the video into factorization windows and transition windows for processing by different types of video stabilization techniques, the video partitioning techniques may be applied to partition a video into other or different types of windows for processing by other types of video or image processing techniques.

Factorization Window Stabilization Techniques

The subspace video stabilization technique described in patent application Ser. No. 12/953,703 computes a subspace factorization by first stacking all the n point trajectories over k frames in to a large matrix $M_{2n \times k}$, and then factorizing into the product of two low-rank matrices:

$$M_{2n \times k} = W \square (C_{2n \times r} E_{r \times k}) \qquad (2)$$

where W is a binary mask matrix with 0 indicating missing data and 1 indicating existing data, r is the chosen rank (typically 9), and $\square$ indicates component-wise multiplication. The r row vectors of E may be referred to as eigen-trajectories, in that they represent the basis vectors that can be linearly combined to form a 2-D motion trajectory over the window of k frames. The coefficient matrix C represents each observed feature as such a linear combination. The technique performs temporal Gaussian smoothing directly on the matrix E, and re-multiplies with coefficient matrix C to form a new matrix of trajectories.

However, as previously noted, this approach may have a number of problems. For example, the factorization may not complete if the tracks are poor. As another example, it is difficult to impose boundary constraints between different windows when performing Gaussian smoothing. As yet another example, strong Gaussian smoothing has a well-known "shrinkage" problem, where the ends of an open curve will shrink in; the beginning and end of sequences produced by the subspace video stabilization technique as described in patent application Ser. No. 12/953,703 may exhibit this problem.

There are several goals that may motivate smoothing the eigen-trajectories. One such goal is to preserve the subspace property of the trajectory motion. Another such goal is to achieve smooth motion. Yet another such goal is to achieve motion that is similar to the original motion. These goals may be encoded directly in an optimization framework as described below. This optimization framework also allows for boundary constraints, and avoids the above-noted shrinkage problem.

In embodiments of the factorization window stabilization technique as described herein, instead of smoothing the eigen-trajectories $E_{r \times k}$ with a filter, the eigen-trajectories are treated as unknowns in an optimization. A solution for these unknowns is computed as those that minimize an energy function encoding the goals defined above.

Figure 8:
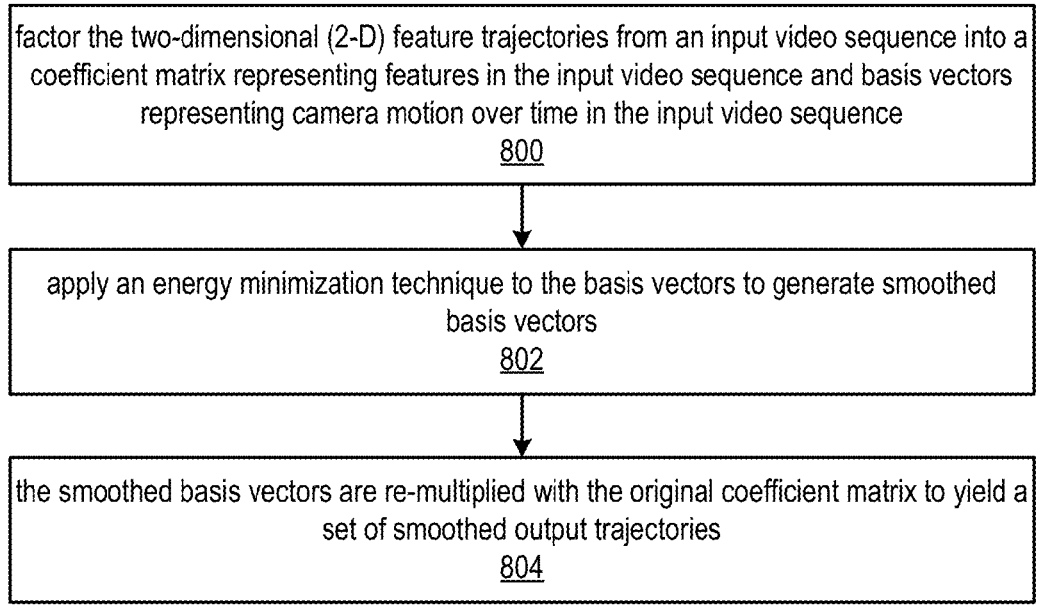
FIG. 8 is a high-level flowchart of a factorization window stabilization technique, according to at least some embodiments.

FIG. 8 is a high-level flowchart of a factorization window stabilization technique, according to at least some embodiments. As indicated at 800, the two-dimensional (2-D) feature trajectories from an input video sequence are factored into a coefficient matrix representing features in the input video sequence and basis vectors representing camera motion over time in the input video sequence. As indicated at 802, an energy minimization technique is applied to the basis vectors to generate smoothed basis vectors. In at least some embodiments, the energy minimization technique treats the basis vectors as unknowns in an optimization framework and computes a solution for each unknown in the optimization framework that minimizes an energy function that is the sum of a first data term that keeps the smoothed feature trajectories close in position to the original feature trajectories, a smoothness term that smoothes the feature trajectories over time, and a second data term that preserves temporal consistency between overlapping windows. As indicated at 804, the smoothed basis vectors are re-multiplied with the original coefficient matrix to yield a set of smoothed output trajectories.

The following describes element 802 of FIG. 8, the energy minimization technique applied to the basis vectors, in more detail.

Consider a subspace window with n points over k frames. Given the factorization previously computed, the coefficient matrix $C_{2n \times r}$ is treated as known, but new values for $E_{r \times k}$ are computed. That is, the eigen-trajectories are treated as unknowns. This optimization encodes the subspace constraints automatically, since each smoothed trajectory may still be created by multiplying the coefficient matrix with the eigen-trajectories.

In at least some embodiments, the energy function is a sum of a data term and smoothness term over each tracked point in each frame. The data term D(E) indicates that the output, smoothed trajectories should be close in position to the original trajectories:

$$D(E) = \sum_{i=1}^{k}\sum_{j=1}^{n} \chi_{i,j}\lambda_{i,j}(x_{i,j} - C_j E_i)^2. \quad (3)$$

In this equation, $\chi_{i,j}$ is an indicator function that is 1 if the jth track exists on the ith frame and 0 otherwise, $x_{i,j}$ is the original tracked location of the jth track in the ith frame, and $\lambda_{i,j}$ is a weight on each trajectory (the computation of this weight is described later in this document). $C_j$ indicates the two rows (2×r) of the matrix C that contain the coefficients for the jth track, and $E_i$ is the column (r×1) of the matrix E that contains the eigen-trajectories at frame i. Note that the matrix E is the only unknown in this term.

The smoothness term indicates that the smoothed trajectories should move smoothly over time. One method to maximize smoothness is to minimize the second derivative of the motion of each trajectory. Therefore, the smoothness term S(E) is:

$$S(E) = \sum_{i=2}^{k-1}\sum_{j=1}^{n} \chi_{i,j}\chi_{i-1,j}\lambda_{i,j}C_j(-E_{i-1} + 2E_i - E_{i+1})^2. \quad (4)$$

Finally, a second data term is added that preserves temporal consistency between any overlapping windows (see, e.g., FIG. 1). For any feature $x_{i,j}$ in a frame that has a corresponding feature (which may be denoted as $\hat{x}_{i,j}$ with indicator function $\hat{\chi}_{i,j}$) in the same frame for an overlapping window, the computed location should be close to the location from the overlapping window. Therefore, a data term D'(E) is added:

$$D'(E) = \sum_{i=1}^{k}\sum_{j=1}^{n} \hat{x}_{i,j}\lambda_{i,j}(\hat{x}_{i,j} - C_j E_i)^2. \quad (5)$$

Note that this data term is always zero for frames that do not overlap with other windows.

The complete energy function is a weighted version of these three energy terms:

$$\xi = D(E) + \alpha D'(E) + \beta S(E). \quad (6)$$

where β controls the degree of smoothness. In at least some embodiments, β and/or α may be user-settable parameters. In at least some embodiments, α=100 as the default; however, other values for α may be used. In at least some embodiments, the default value of β may be 200; however, other default values for β may be used.

Finally, in at least some embodiments, the weight $\lambda_{i,j}$ in equation (3) may be used to fade-in and fade-out the contribution of each trajectory over time to preserve temporal coherence. A technique that may be used to set this weight is described in reference to FIG. 5 of the published paper *Content-preserving warps for 3D video stabilization*, which appeared in ACM Trans Graphics 28, 3, Article No 44, 2009, the content of which was previously incorporated by reference.

The overall energy function is a linear least squares problem, i.e., quadratic in the unknowns E, and so can be minimized to its global minimum by solving a single sparse linear system.

A complication may arise if there are fewer than r trajectories for a frame. Generally, when solving a least squares problem, at least as many constraints are needed as the number of variables. If there are not enough constraints (e.g., if there are fewer than r trajectories for a frame), the least squares problem is under-constrained, and there are multiple possible solutions. In this case, the technique may add a lightly-weighted (e.g., 0.01) constraint that $E_i=0$ for any frame i without at least r trajectories.

No Motion Option for Factorization Windows

An alternative to smoothing motion is to attempt to achieve no motion at all, similar to what a camera on a tripod would see. In at least some embodiments, this "no motion" effect may be provided as an option to the user via a user interface. In at least some embodiments, to achieve this effect, the smoothness term may be changed so that it attempts to eliminate any motion whatsoever. Specifically, the first derivative, instead of the second derivative, is minimized:

$$S(E') = \sum_{i=1}^{k-1}\sum_{j=1}^{n} \chi_{i,j}\chi_{i+1,j}\lambda_{i,j}C_j(E_i - E_{i+1})^2. \quad (7)$$

The weight of this term may also be strongly increased by setting β to a higher value (e.g., β=2000 instead of β=200). All other terms remain the same.

Transition Window Stabilization Techniques

The general paradigm of a stabilization algorithm is to compute a set of displacements for each image; the displacements are used to compute a warp for the image. In the case of transition windows, at least some embodiments may require the displacements for an image to follow a 2-D parametric transformation (see details below). Therefore, embodiments may only need to compute a 2-D parametric transformation for each image (i.e., each frame of the transition window). Depending on the type of motion the user wants, which can be either smooth motion or no motion, the techniques for computing the transformations are different. A technique for computing smooth motion for transition windows is described, followed by a description of a no motion technique for transition windows. However, before describing these techniques, a technique for handling the case where there is insufficient information to process the entire transition window is described.

Subdividing Transition Windows

Some frames in a transformation window may not include enough features to successfully perform a 2-D parametric transformation. Therefore, in at least some embodiments, a transition window may be subdivided into subwindows, with one or more subwindows each including frames that that do not have a sufficient number of features for performing a 2-D parametric transformation, and one or more other subwindows each including frames that that do have a sufficient number of features for performing a 2-D parametric transformation. The first set of subwindows that include frames with insufficient features may then be processed separately from the second set of windows to which a 2-D parametric transformation is applied.

Figure 9A:
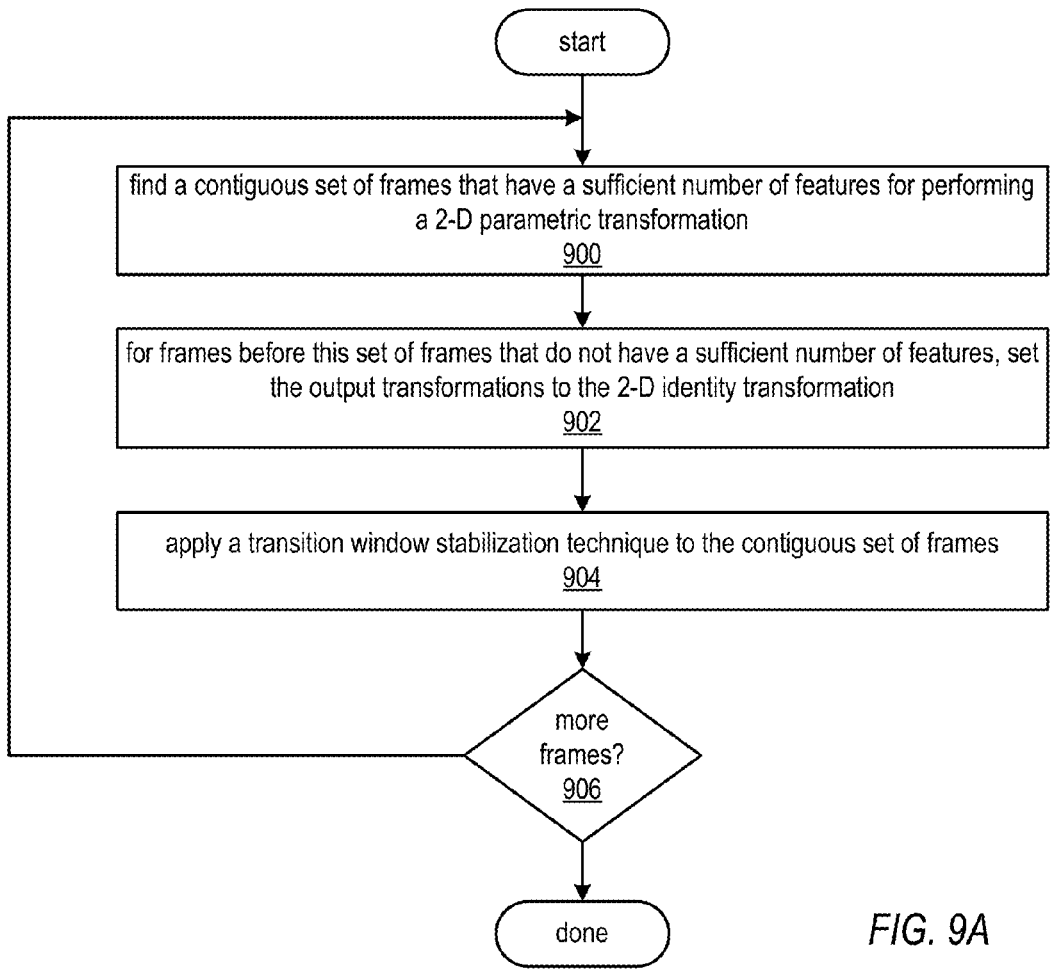
FIG. 9A illustrates a technique for subdividing a transition window into two types of subwindows and processing the two types of subwindows differently, according to at least some embodiments.

FIG. 9A illustrates a technique for subdividing a transition window into two types of subwindows and processing the two types of subwindows differently, according to at least some embodiments. Let M be the number of frames in a transition window of interest. Feature trajectories generated by the feature tracking technique are assumed. However, only the trajectories that have overlaps with the transition window of interest are of interest. Let N be the number of feature trajectories that have overlaps with the transition window of interest. From these N trajectories, the number of features on each frame in the window can be computed, and this number can be compared against a threshold. There are two possibilities. The first case is that there is no frame that has a sufficient number of features (e.g., greater than or equal to the threshold) for performing the 2-D parametric transformation. In this case, the technique simply skips the entire optimization algorithm and sets the output transformations to the 2-D identity transformation for both smooth motion and no motion cases, essentially keeping the feature trajectories as they originally were. The second case is that there are frames with sufficient numbers of features for performing the 2-D parametric transformation. In this case, the technique finds the first contiguous set of frames in which there are a sufficient number of features for performing the 2-D parametric transformation, as indicated at 900 of FIG. 9A. As indicated at 902 of FIG. 9A, frames before this set of frames in the transition window that do not have a sufficient number of features for performing the 2-D parametric transformation, if any, are handled by setting the output transformations to the 2-D identity transformation; no optimization is performed. In at least some embodiments, the length of this contiguous set of frames is compared against a window length threshold. If the length is greater than the threshold, the window length is truncated to the threshold. As indicated at 904 of FIG. 9A, a transaction window stabilization technique that employs a 2-D parametric transformation is applied to the frames in this set of windows. The transaction window stabilization technique may be a technique for computing smooth motion for transition windows as described below, or a no motion technique for transition windows as described below.

Figure 9B:
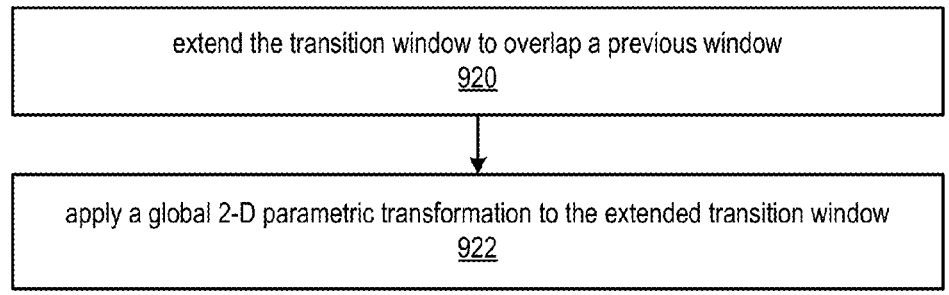
FIG. 9B is a high-level flowchart of a transaction window stabilization technique, according to at least some embodiments.

FIG. 9B is a high-level flowchart of a transaction window stabilization technique, according to at least some embodiments. As indicated at 920, the transition window may be extended to overlap a previous window, which may be a factorization window or another transaction window. As indicated at 922, a global 2-D parametric transformation may be applied to the extended transition window, for example to smooth the feature trajectories in the window. In at least some embodiments, the global 2-D parametric transformation may be a global 2-D similarity transformation. In at least some embodiments, the global 2-D parametric transformation may be configured to produce smooth motion, or optionally to produce no motion. Further details of these transaction window stabilization techniques are described in the sections titled Smooth motion in transition windows and No motion option in transition windows.

Returning to FIG. 9A, the transition window processing technique is restarted at the frame after the set of frames to find another contiguous set of frames in which there are a sufficient number of features. This may be repeated until all frames in the transition window have been processed, as indicated at 906 of FIG. 9A. Note that, while each of these sets of frames and each set is a subwindow of a transition window produced by the previously described video partitioning technique, these sets of frames can be considered as a transition window that is processed by the transition window stabilization techniques as described in the following sections.

Smooth Motion in Transition Windows

This section describes a technique for computing smooth motion for transition windows, according to at least some embodiments. Let M be the number of frames in a transition window. This transition window is extended O frames to overlap with a previous window, which can be either a factorization window or another transition window. Let N be the number of feature trajectories that have overlaps larger than a threshold with the transition window of interest. $x_{i,j}$ is denoted to be the location of the jth feature trajectory on the ith image.

It may be assumed that in the overlapping frames, for each $x_{i,j}$, there is a corresponding smooth feature location $\hat{x}_{i,j}$, which is computed from the optimization result of the previous window. Note that a feature trajectory may not span all the frames, i.e. $x_{i,j}$ is not defined for all the combinations of i and j. Without loss of generality, a characteristic function $\chi_{i,j}$ may be used to denote this information; in at least some embodiments, $\chi_{i,j}$ may be set to 1 if the jth trajectory is available on the ith image, and $\chi_{i,j}$ may be set to 0 otherwise.

For factorization windows, displacements may be based on subspace constraints, as previously described. Instead, for transition windows, a technique may be used that restricts all the displacements in one image (frame) to follow a global 2-D transformation. At least some embodiments may employ 2-D similarity transformations; however, the technique may be generalized to other parametric transformations. Note that a global 2-D similarity transformation for an image is fairly strict. However, an advantage is that the transformations may be computed robustly from a very few number of trajectories.

A 2-D similarity transformation S may be parameterized with three parameters: an angle $\theta \in [-\pi, \pi]$, a scale $s \in \square$, and a 2-D offset t:

$$t = [t_x, t_y]^T \in \square^2.$$

The application of a 2-D similarity transformation on a point $x = [x, y]^T$ is given by:

$$S(x) = s \begin{bmatrix} \cos\theta & -\sin\theta \\ \sin\theta & \cos\theta \end{bmatrix} \begin{bmatrix} x \\ y \end{bmatrix} + \begin{bmatrix} t_x \\ t_y \end{bmatrix}. \tag{8}$$

All of the 2-D similarity transformations form a group. The following discusses the composition of two transformations and the inverse of a transformation. The composition of two similarity transformations is given by $$(\theta_1 + \theta_2, s_1 s_2, S_1(t_2) + t_1) \tag{9}$$

The inverse of a transformation is given by:

$$\left(-\theta, \frac{1}{s}, -\frac{1}{s}\begin{bmatrix} \cos\theta & \sin\theta \\ -\sin\theta & \cos\theta \end{bmatrix} t\right). \tag{10}$$

In at least some embodiments, all of the similarity transformations in a transition window may be computed jointly by optimizing a cost function. In at least some embodiments, the cost function may be implemented as follows. First, the output video should be close to the input video. This may be manifested through a data cost that encourages the transformations to follow the input feature locations, including the smooth one, in the overlapping frames:

$$\sum_{i=1}^{O} \sum_{j=1}^{N} \chi_{i,j} \alpha_{i,j} (\hat{x}_{i,j} - S_i(x_{i,j}))^2 + \sum_{i=O+1}^{M+O} \sum_{j=1}^{N} \chi_{i,j} \alpha_{i,j} (x_{i,j} - S_i(x_{i,j}))^2 \tag{11}$$

where $\alpha_{i,j}$ is the weight for each term which can vary according to both i and j. A method for computing the weights is discussed later in this document. Second, the transformations should yield a video with smooth motion. There are several ways to encode this requirement in a cost function. For example, the following two smoothness terms may be used:

$$\sum_{i=2}^{M+O-1} \sum_{j=1}^{N} \chi_{i-1,j} \chi_{i,j} \chi_{i+1,j} \beta_{i,j} (2S_i(x_{i,j}) - S_{i-1}(x_{i-1,j}) - S_{i+1}(x_{i+1,j}))^2 \quad (12)$$

$$\sum_{i=2}^{M+O-1} \sum_{j=1}^{N} \chi_{i-1,j} \chi_{i,j} \chi_{i+1,j} \beta_{i,j} (2x_{i,j} - S_i^{-1}(S_{i-1}(x_{i-1,j}) - S_{i+1}(x_{i+1,j})))^2 \quad (13)$$

where $\beta_{i,j}$ are a different set of weights and $S_i^{-1}$ is the inverse of $S_i$. Note that $\chi_{i-1,j}\chi_{i,j}\chi_{i+1,j}$ indicates that a smoothness term is active only if the corresponding feature is available one all three images.

While either of the smoothness terms given in equations 12 and 13 may be used in embodiments, it can be demonstrated experimentally that the second smoothness term (equation 13) works significantly better than the first smoothness term (equation 12).

The final cost function is a combination of the data and smoothness terms.

$$\operatorname*{argmin}_{S_i} \sum_{i=1}^{O} \sum_{j=1}^{N} \chi_{i,j} \alpha_{i,j} (\hat{x}_{i,j} - S_i(x_{i,j}))^2 + \quad (14)$$

$$\sum_{i=O+1}^{M+O} \sum_{j}^{N} \chi_{i,j} \alpha_{i,j} (x_{i,j} - S_i(x_{i,j}))^2$$

$$\sum_{i=2}^{M+O-1} \sum_{j=1}^{N} \chi_{i-1,j} \chi_{i,j} \chi_{i+1,j} \beta_{i,j} (2x_{i,j} - S_i^{-1}(S_{i-1}(x_{i-1,j}) - S_{i+1}(x_{i+1,j})))^2$$

This cost function is nonlinear least squares in terms of ($\theta_i$, $s_i$, $t_i$). In at least some embodiments, an iterative global optimization technique such as the Levenberg-Marquardt technique may be applied to perform the optimization. In at least some embodiments, parameter initialization may be performed as follows:

$$\begin{cases} \theta_i = 0 \\ s_i = 1 \\ t_i = [0, 0]^T \end{cases} \quad (15)$$
$$i = 1, 2, \ldots, M$$

The jacobian matrix computed in the Levenberg-Marquardt technique has a block structure and is very sparse. In at least some embodiments, this sparsity may be leveraged to implement the algorithm more efficiently.

Weights

In at least some embodiments, the weights $\alpha_{i,j}$ and $\beta_{i,j}$ may be computed as follows. First, a weight $\gamma_{i,j}$ is computed for each point $x_{i,j}$. A technique that may be used to compute this weight is described in the published paper *Content-preserving warps for 3D video stabilization*, which appeared in ACM Trans Graphics 28, 3, Article No 44, 2009, the content of which was previously incorporated by reference. The technique then counts the number of non-zero weights in an image I, denoted as $\gamma_i$. The technique then finds the maximum value of $\gamma_i$ over all the images, denoted as $\gamma$. The weights $\alpha_{i,j}$ may be given as:

$$\alpha_{i,j} = \frac{\gamma}{\gamma_i} \gamma_{i,j} \alpha_i \quad (16)$$

where $\alpha_i$ is a set of weights as given below:

$$\alpha_i = \begin{cases} \alpha & i = 1, 2, \ldots, O \\ 1 & i = O+1, O+2, \ldots, O+M \end{cases} \quad (17)$$

where $\alpha$ is a user-adjustable parameter with a default value, for example 100. The weights $\beta_{i,j}$ may be given as $$\beta_{i,j} = \gamma_{i,j} \beta \quad (18)$$

where $\beta$ is a user-adjustable parameter with a default value, for example 100 or 200.

No Motion Option in Transition Windows

An alternative to smoothing motion is to attempt to achieve no motion at all, similar to what a camera on a tripod would see. In at least some embodiments, this "no motion" effect may be provided as an option to the user via a user interface. Different techniques may be used to achieve the no motion effect for transition windows. A first technique that may be used in some embodiments is to simply use the same technique as given above for smooth motion, but with much larger weights for the smoothness terms. Another technique that may be used in some embodiments is described below.

In this technique, the following cost function may be optimized:

$$\operatorname*{argmin}_{S_i \hat{x}_j} \sum_{i=O+1}^{M+O} \sum_{j=1}^{N} \chi_{i,j} \alpha_{i,j} (x_{i,j} - S_i(\hat{x}_j))^2. \quad (19)$$

However, there is an ambiguity between $S_i$ and $\hat{x}_j$ in that, for any 2-D similarity transformation S:

$$S_i(\hat{x}_j) = (S_i S)(S^{-1}(\hat{x}_j)). \quad (20)$$

In at least some embodiments, to eliminate this ambiguity, $S_{O+1}$ may be set to the identity transformation, i.e. ($\theta=0$, $s=1$, $t=[0, 0]^T$). In at least some embodiments, an iterative global optimization technique such as the Levenberg-Marquardt technique may be applied to perform the optimization. In at least some embodiments, parameter initialization may be performed as follows:

$$\hat{x}_j = x_j, \quad (21)$$
$$j = 1, 2, \ldots, N$$

and $$\begin{cases} \theta_i = 0 \\ s_i = 1 \\ t_i = \sum_{k=1}^{i} \Delta t_k \end{cases}$$
$$i = 1, 2, \ldots, M$$

where $\Delta t$ is a 2-D offset computed between image i and image i+1. This offset may be computed from tracked points between the two images, for example using a relatively simple least squares algorithm as follows:

$$\underset{\Delta t_i}{\operatorname{argmin}} \sum_{j=1}^{N} \chi_{i,j}(x_{i,j} + \Delta t_i - x_{i+1,j})^2. \quad (22)$$

The jacobian matrix computed in the Levenberg-Marquardt technique has a block structure and is very sparse. This sparsity may be leveraged to implement the algorithm efficiently.

The final transformation may be given by:

$$S_O \Delta S_{O,O+1} S_i^{-1}, i=O+1, O+2, \ldots, O+M \quad (23)$$

where $S_i$ are the results of optimizing equation (19) and $S_O$ is the 2-D similarity transformation of the last frame in the previous window. In the case when there is not a previous window, $S_O$ may be set to the identity transformation. In the case when there is an overlap with respect to a previous window, $\Delta S_{O,O+1}$ may be a relative 2-D similarity transformation between frame O and frame O+1; otherwise, $\Delta S_{O,O+1}$ may be set to be the identity transformation. In at least some embodiments, the previously mentioned relative 2-D similarity transformation may be computed by optimizing the following cost function:

$$\underset{\Delta S_{O,O+1}}{\arg\min} \sum_{j=1}^{N} \chi_{i,j}(x_{O,j} - \Delta S_{O,O+1}(x_{O,j}))^2. \quad (24)$$

Determining and Applying Warping Models

The techniques as described above generate a new, smoothed location for each tracked point in each frame, either using a subspace method applied to frames in factorization windows (described in the section titled Factorization window stabilization techniques) or a technique applied to frames in transition windows (described in the section titled Transition window stabilization techniques). The vector between each original track or trajectory and its smoothed location may be referred to as a displacement; the displacements indicate how to warp an input video frame so that its motion is stabilized. In this section, techniques for determining and applying warping models are described.

Figure 10:
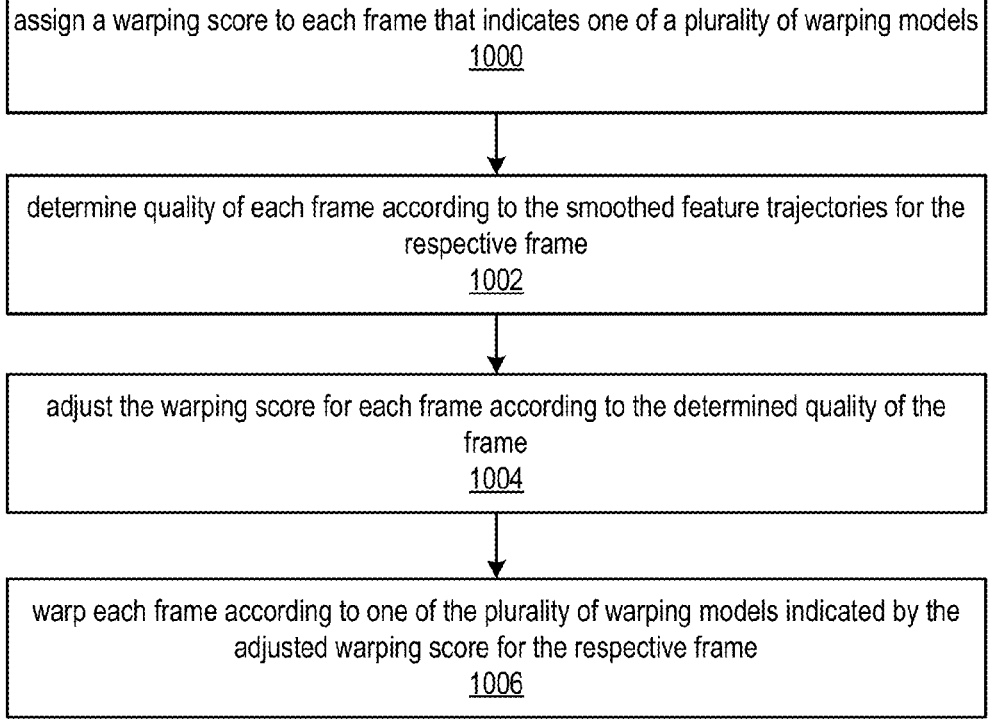
FIG. 10 is a high-level flowchart of a method for determining and applying warping models, according to at least some embodiments.

FIG. 10 is a high-level flowchart of a method for determining and applying warping models, according to at least some embodiments. As indicated at 1000, the method may assign a warping score to each frame that indicates one of a plurality of warping models. As indicated at 1002, the method may determine a quality metric or metrics for each frame according to the smoothed feature trajectories for the respective frame. As indicated at 1004, the method may then adjust the warping score for each frame according to the determined quality metric(s) of the frame. As indicated at 1006, each frame may then be warped according to one of the plurality of warping models indicated by the adjusted warping score for the respective frame. Further details of the method for determining and applying warping models are given below.

In at least some embodiments, the primary warping technique that is used may be a content-preserving warping technique. A content-preserving warping technique that may be used in at least some embodiments is described in U.S. patent application Ser. No. 12/276,119, entitled "Content-Aware Video Stabilization," filed Nov. 21, 2008, the content of which is incorporated by reference herein in its entirety. A content-preserving warping technique that may be used in at least some embodiments is also described in the published paper *Content-preserving warps for 3D video stabilization*, which appeared in ACM Trans Graphics 28, 3, Article No 44, 2009, the content of which was previously incorporated by reference.

The content-preserving warping technique described in patent application Ser. No. 12/276,119 applies a homography to get a rough approximation of the overall warp. The content-preserving warping technique then uses known trajectories to guide a deformation of a mesh. Even though the results of such a warp may not be physically accurate, the results are generally visually plausible.

The content-preserving warping technique may be well-suited for achieving a stable look when there are a sufficient number of high-quality displacements. However, when the input information is fairly weak and sparse, the content-preserving warping technique may lead to distorted results. In at least some embodiments, to address this issue, the quality of the displacements may be evaluated, and the warping technique that is applied may be scaled back conservatively if the quality of the displacements is low, for example below a specified displacement quality threshold.

In at least some embodiments, to perform the scaling back of the warping technique, each frame may be assigned a warping score that indicates a warping method or model. As a non-limiting example, a warping score of 4 may be used to indicate a content-preserving warp, and scores 1 through 3 may be used to indicate more restricted warps that are fit to the displacements in a least squares manner. As a non-limiting example, a warping score of 3 may indicate a homography, a warping score of 2 may indicate a similarity transform, and a warping score of 1 may indicate a whole-frame translation. In at least some embodiments, each frame in a subspace window may be initially assigned a warping score of 4, and each frame in a transition window is assigned a warping score of 2 since transition windows optimize similarity transforms to begin with.

In some embodiments, the whole-frame translation may not be included in the warping techniques. As a non-limiting example, a warping score of 4 may be used to indicate a content-preserving warp, a warping score of 3 may indicate a homography, and a warping score of 2 may indicate a similarity transform. Alternatively, a warping score of 3 may be used to indicate a content-preserving warp, a warping score of 2 may indicate a homography, and a warping score of 1 may indicate a similarity transform. The values of the scores used to represent the warping techniques are not intended to be limiting; any scale of scores may be used.

For the discussion that follows, it is assumed that a warping score of 4 indicates a content-preserving warp, a warping score of 3 indicates a homography, and a warping score of 2 indicates a similarity transform.

In at least some embodiments, to evaluate the quality of the displacements, a series of sanity checks may be performed that might reduce the warping score for at least some frames. First, outlier displacements may be rejected by fitting a similarity transform to the set of displacements for a frame and computing the median error from the similarity transform. Any displacement whose error is more than a threshold (e.g., 4.75 times) the median error is rejected outright. Points whose error fall between a range (e.g., 3.0 times and 4.75 times) the median error have their weights reduced by an exponential function, for example 1 at error 3.0, and nearly 0 at error 4.75. Finally, if the median error is more than a specified percentage (e.g., 15%) of the frame width, this indicates that the displacements are fairly messy. In this case, the warping score may be reduced, for example to 2, to indicate a similarity transform.

In at least some embodiments, another sanity check is performed that compares the best-fit similarity transform and best-fit homography. If these two warps are very different from each other, this indicates the homography contains significant distortions such as shearing and keystoning, which are not possible in similarity transforms. The technique may take the L1 distance between transform matrices of the homography and similarity transform; if this distance is greater than a threshold (e.g., 50), the warping score may be reduced, for example to 2, to indicate a similarity transform.

In at least some embodiments, the warping scores may be temporally smoothed, since the warp should not jump between models over time; this smoothing can produce non-integral warping scores, e.g., 2.5. Conceptually, a low score at one frame limits the score at nearby frames, with a linear fade-out of N frames (e.g., 30 frames) per warping score increment. For example, if frame 100 has a score of 2, frame 130 may have at most a score of 3, and frame 160 is the first frame that can have a full score of 4.

In at least some embodiments, an upside-down pyramid function may be placed at each frame, with the tip of the pyramid having that frame's warping score. Each frame's warping score is then set as the minimum value of the superimposed pyramids from all neighboring frames.

Finally, the technique renders a warp for each frame according to the frame's warping score. In at least some embodiments, non-integral warping scores may be rendered by cross-fading the warped grids between two warps. For example, a warping score of 3.5 may be applied by first computing grids from both a content-preserving warp and a homography, and averaging the two results. Similarly, a warping score of 2.8 may be applied by first computing grids from both a homography and a similarity transform, and combining the results with appropriate weighting towards the homography results.

Cropping Technique

Figure 3A:
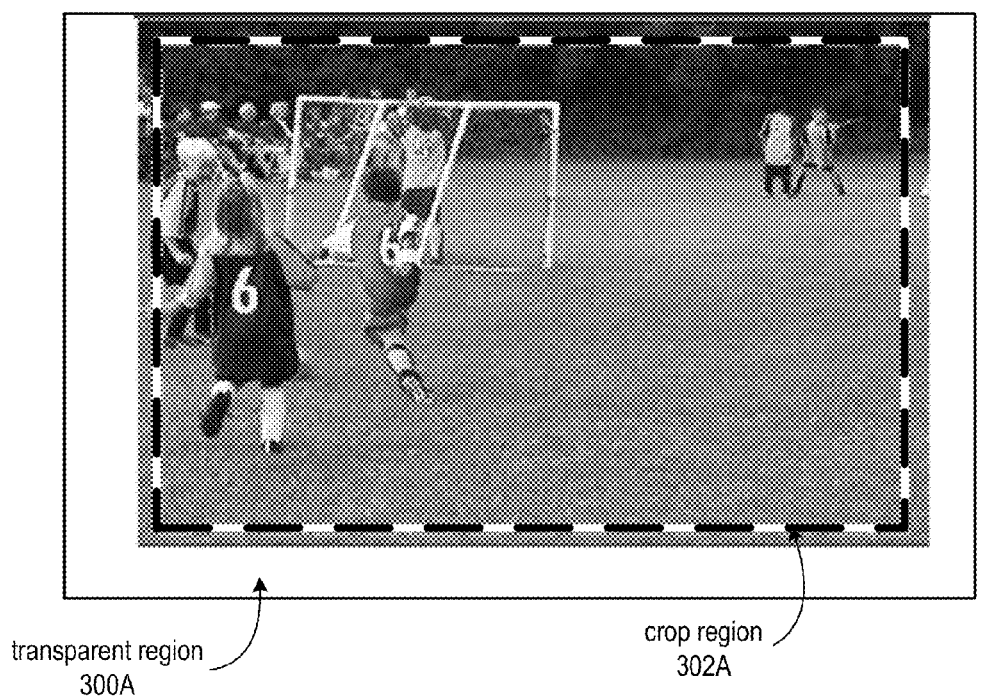
FIGS. 3A and 3B illustrate portions of a cropping technique applied to example frames from an uncropped but stabilized video, according to at least some embodiments.
Figure 3B:
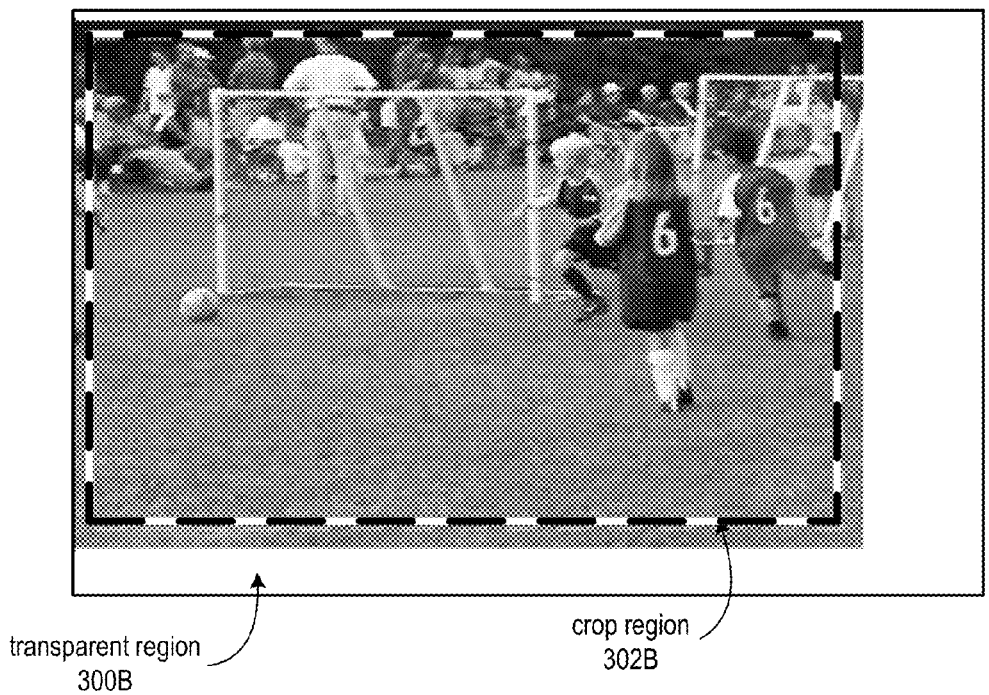

In at least some embodiments, after the warped mesh for each frame is computed as described above, an uncropped video may be generated by directly rendering each warped frame onto a respective large canvas that is the union of all meshes, as shown in FIGS. 3A and 3B. FIGS. 3A and 3B show example frames 617 and 641, respectively, from an uncropped but stabilized video. The transparent regions 300 represent the regions of the canvases that are not covered by the frames. A cropping technique may then be applied to remove the transparent edges on each frame and generate a final video that contains no transparent pixels. To achieve this, the cropping technique may determine the width and height of the cropping window (Wc,Hc), and its center on frame t ($x_c^t$, $y_c^t$) (used as an anchor point), which together satisfy the following constraints for each frame:

The cropping window should contain no transparent pixels;

The size of the cropping window should be as large as possible, so that the final video contains as much content as possible; and The center (anchor point) of the cropping window should move smoothly across time to avoid introducing additional camera motion into the final video.

Figure 11:
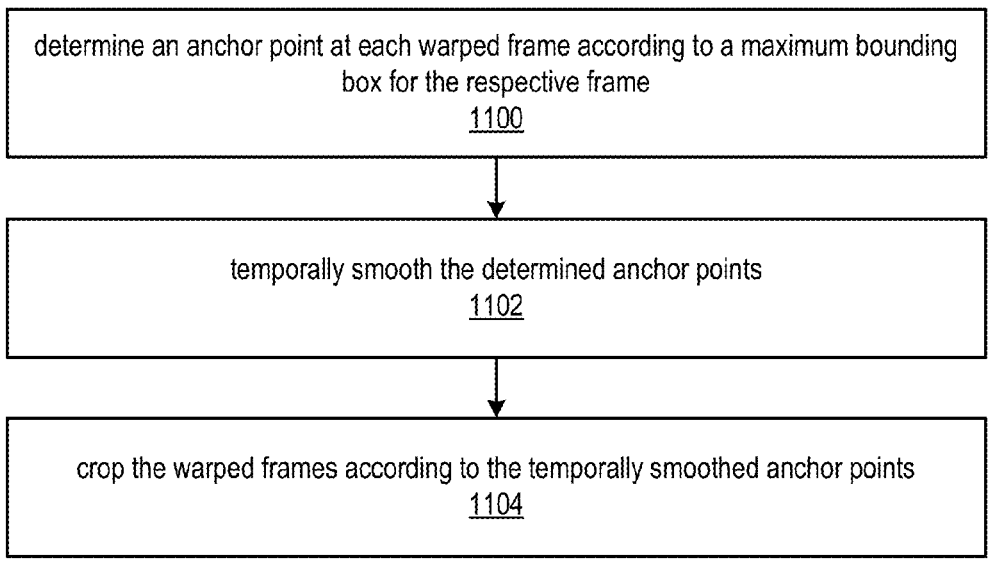
FIG. 11 is a high-level flowchart of a cropping technique, according to at least some embodiments.

FIG. 11 is a high-level flowchart of a cropping technique, according to at least some embodiments. As indicated at 1100, the technique may determine an anchor point at each warped frame according to a maximum bounding box for the respective frame. As indicated at 1102, the technique may then temporally smooth the determined anchor points. As indicated at 1104, the warped frames may then be cropped according to the temporally smoothed anchor points. Further details of the cropping technique are given below.

Figure 4A:
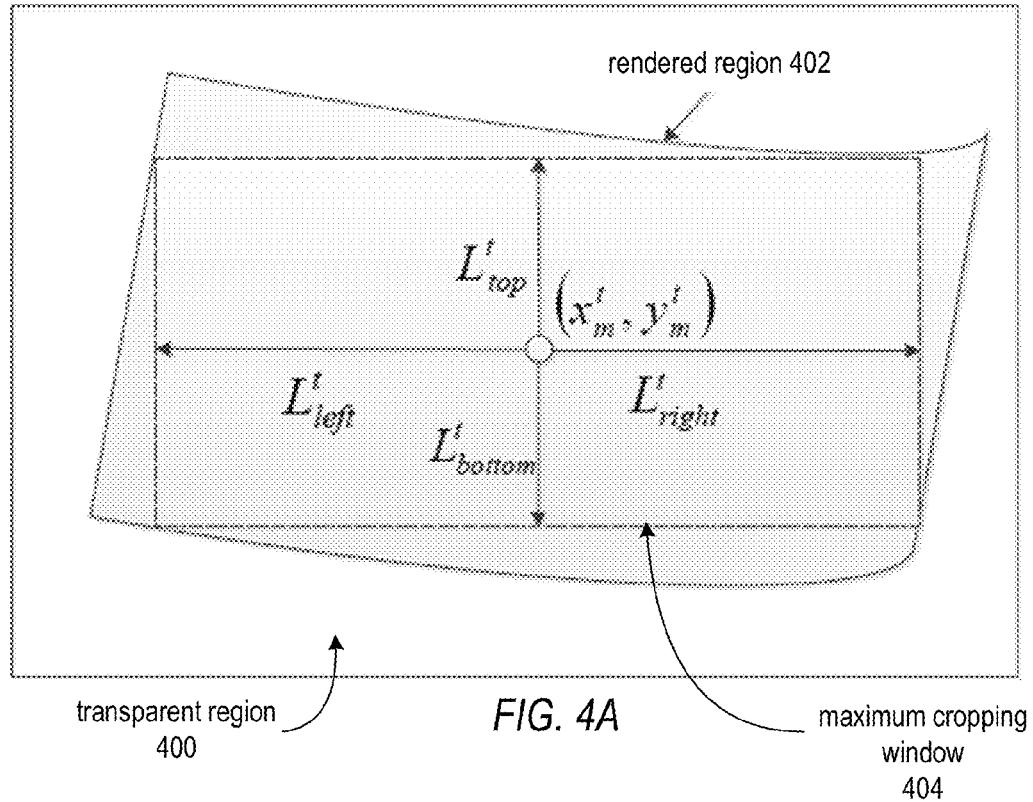
FIG. 4A shows that, on each frame, the cropping technique according to at least some embodiments first determines the scene center, the maximum possible cropping window, and the distances from the center to the four edges.
Figure 4B:
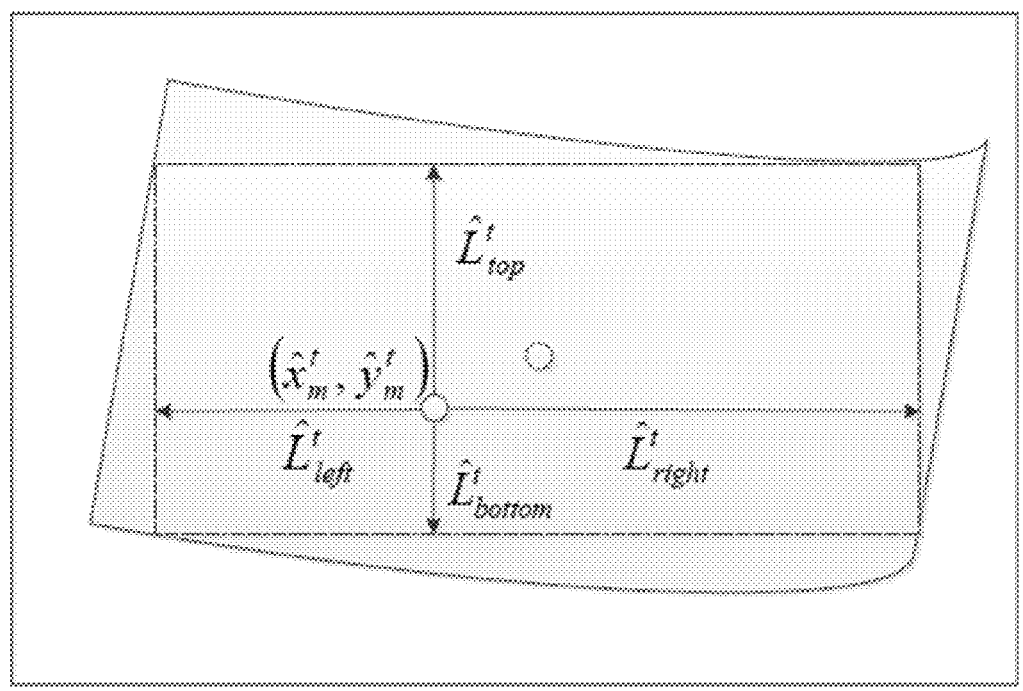
FIG. 4B shows that, in the cropping technique according to at least some embodiments, after temporal smoothing, the scene center position is shifted, and its distances to the four edges are updated accordingly.

FIG. 4A shows that, on each frame, the cropping technique first determines the scene center, the maximum possible cropping window 404, and the distances from the center to the four edges. FIG. 4B shows that, after temporal smoothing, the scene center position is shifted, and its distances to the four edges are updated accordingly. In at least some embodiments, the cropping technique may generate cropping windows that satisfy all of these constraints. The technique starts by determining the maximum possible cropping window (maximum cropping window 404 in FIG. 4A) on each frame independently. The maximum cropping window 404 may be denoted as:

$$(x_m^t, y_m^t, L_{left}^t, L_{right}^t, L_{top}^t, L_{bottom}^t)$$

as shown in FIG. 4A, where:

$$(x_m^t, y_m^t)$$

is the center of the mesh on this frame, which is also the center of the scene that the camera captures at time t, and:

$$(L_{left}^t, L_{right}^t, L_{top}^t, L_{bottom}^t)$$

is the length from the scene center to the left, right, top and bottom edge of the maximum cropping window. In at least some embodiments, this may be done by a greedy algorithm which initially sets:

$$L_{left}^t = L_{right}^t = L_{top}^t = L_{bottom}^t = 0$$

and increases each length, for example by one pixel, at each iteration to gradually expand the window. If one edge of the window reaches a transparent pixel, that edge stops moving. When all edges stop, a maximum window 404 that has the largest possible cropping size for the current frame is the result.

The scene center point may be used as the origin or anchor point to decide the location of the cropping window on the current frame. In at least some embodiments, the cropping technique collects all of the scene centers:

$$(x_m^t, y_m^t)$$

on all frames to form a point array, and temporally smoothes the array, for example using a bilateral smoothing filter. The filter may be applied to the X and Y coordinates separately. Using X coordinates as an example, the coordinates may be smoothed as:

$$\hat{x}(m)^t = \frac{\sum (k=-n)^n w(t+k, t) x_m^{t+k}}{\sum (k=-n)^n w(t+k, t)} \quad (25)$$

where $$w(t+k, t) = \exp\left(-\frac{k}{\sigma_t}\right) \cdot \exp\left(-\frac{|x_m^{t+k} - x_m^t|}{\sigma_d}\right). \quad (26)$$

The term $\sigma_t$ determines the length of the filter in terms of the number of neighboring frames, and the term $\sigma_d$ is the range parameter, which in some embodiments may be set at one tenth of the original video width. Increasing $\sigma_t$ and $\sigma_d$ allows the cropping windows to move more smoothly across time, resulting in more stable final results. The downside is that the final video size is often smaller with heavier smoothing. In the extreme case, if $\sigma_t$ and $\sigma_d$ are set to be extremely large, and the filter is applied a large number of times, the cropping window will not move at all, and the final cropping window is the intersection of all maximum possible windows on all frames.

A reason for using a bilateral filter instead of a Gaussian filter is to avoid letting bad frames affect good frames. Bad frames may, for example, occur in examples where during a few frames the rendered image suddenly drifts away from the stable location at which the majority of frames are rendered. Using the bilateral filter, the few bad frames will not affect good frames since the weights between them are low.

After temporally smoothing the point array, a new scene center location $(\hat{x}_m^t, \hat{y}_m^t)$ has been generated for each frame. The technique then updates the distances to the four edges as:

$$\hat{L}_{left}^t, \hat{L}_{right}^t, \hat{L}_{top}^t, \hat{L}_{bottom}^t,$$

as shown in FIG. 4B. The size of the cropping window may be determined by taking the minimal values of the four distances across all frames as:

$$\hat{L}_{left}^{min}, \hat{L}_{right}^{min}, \hat{L}_{top}^{min}, \hat{L}_{bottom}^{min}.$$

On each frame, the four fixed distances may be applied to the scene center to generate the final cropping window for the frame.

While the cropping technique described above relies on the center of the cropping window as the anchor point, other points within the cropping window may be used as the anchor point, for example the top left corner of the cropping window may be used.

Example Implementations

Some embodiments may include a means for performing robust video stabilization as described herein. For example, a video stabilization module may receive an input video sequence, and may perform robust video stabilization to generate a stabilized, and cropped, output video as described herein. The video stabilization module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving a video sequence as input, performing feature tracking on the sequence, partitioning the video sequence into factorization windows and transition windows, applying track smoothing techniques to the windows, determining and applying warping techniques to the frames in the video sequence, and cropping the warped frames, as described herein. Other embodiments of the video stabilization module may be at least partially implemented by hardware circuitry and/or firmware stored, for example, in a non-volatile memory.

Figure 5:
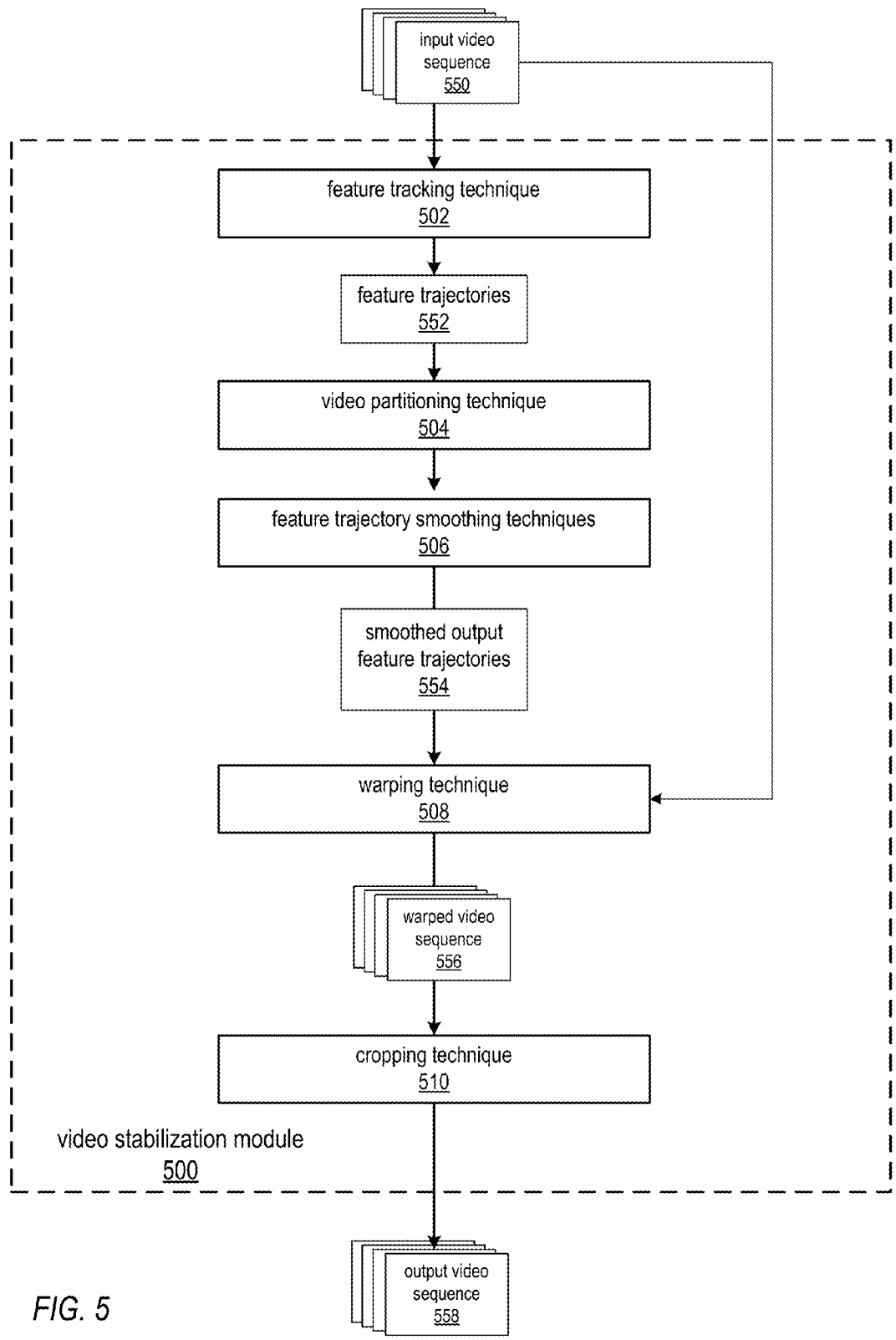
FIG. 5 illustrates an example video stabilization module, and data flow and processing within the module, according to at least some embodiments.
Figure 6:
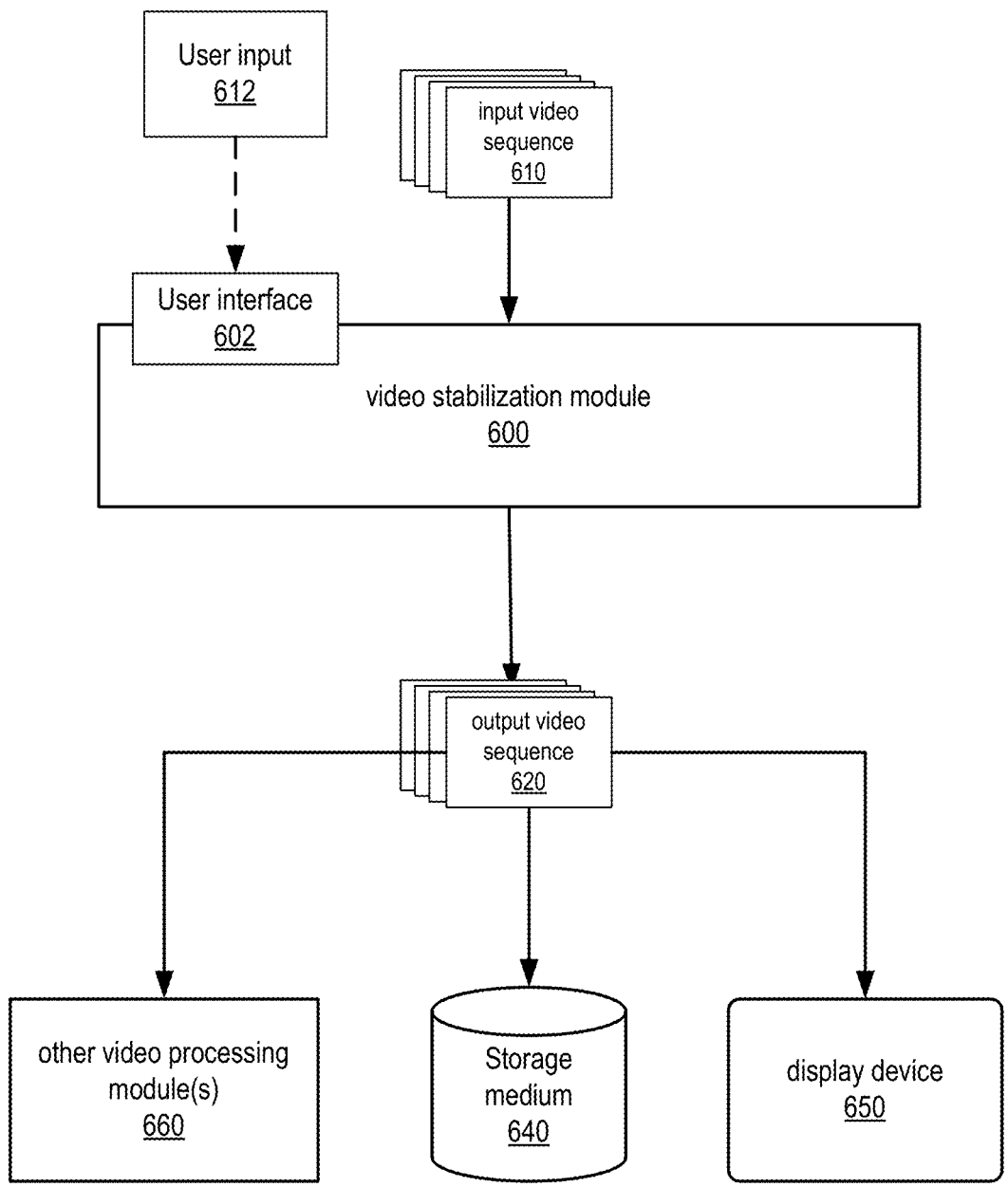
FIG. 6 illustrates a module that may implement video stabilization methods as illustrated in FIGS. 1 through 5 and 7 through 11, according to at least some embodiments.
Figure 12:
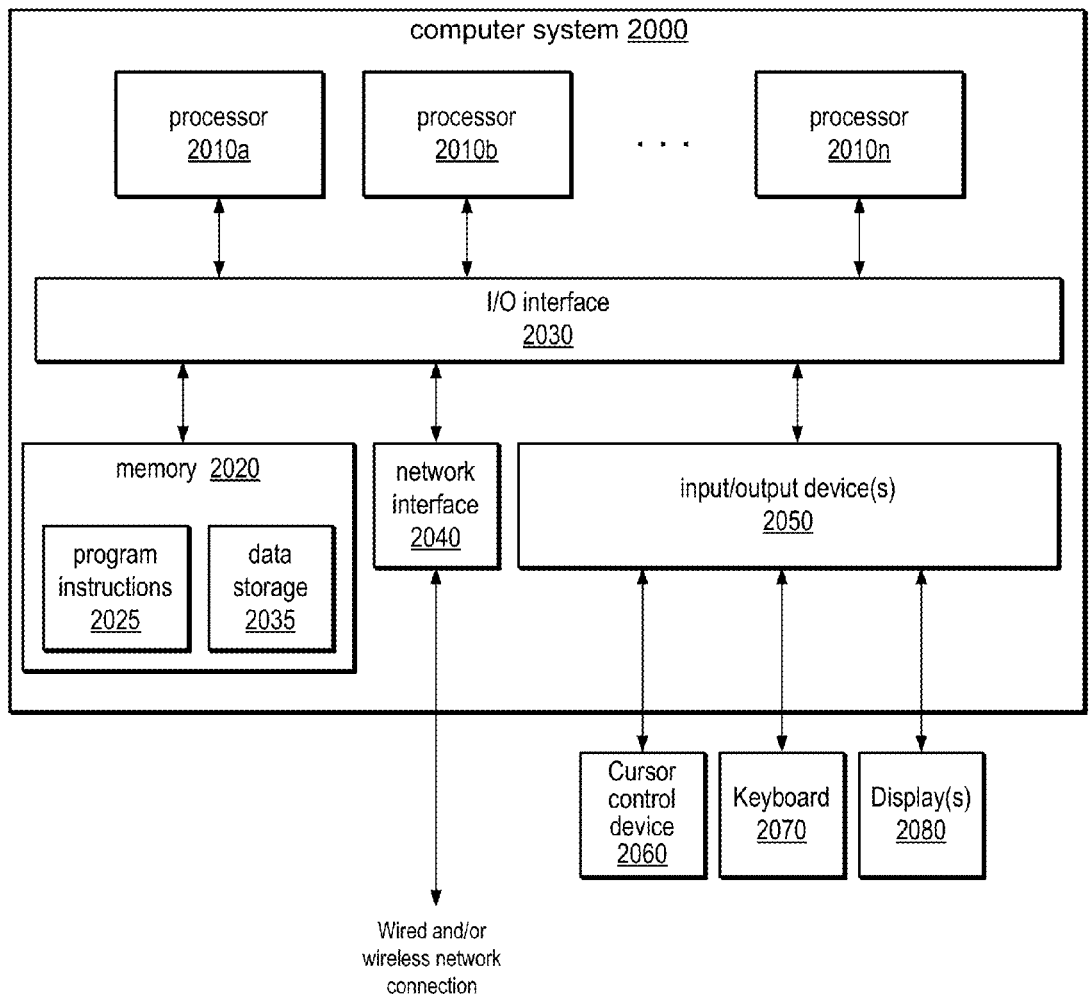
FIG. 12 illustrates an example computer system that may be used in embodiments.

Embodiments of the robust video stabilization technique and/or of the various techniques described as parts of the robust video stabilization technique as described herein may be implemented in software, hardware, or a combination thereof. For example, embodiments of the robust video stabilization techniques may be performed by a video stabilization module implemented by program instructions stored in a computer-readable storage medium and executable by one or more processors (e.g., one or more CPUs or GPUs). Embodiments of a video stabilization module may, for example, be implemented as a stand-alone application, as a module of an application, as a plug-in for applications including image or video processing applications, and/or as a library function or functions that may be called by other applications such as image processing or video processing applications. Embodiments of the video stabilization module may be implemented in any image or video processing application, or more generally in any application in which video sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example video stabilization module that may implement the robust video stabilization methods as described herein is illustrated in FIGS. 5 and 6. An example computer system on which a video stabilization module may be implemented is illustrated in FIG. 12.

In addition to computer system implementations, embodiments of the video stabilization methods as described herein may be implemented in other devices, for example in digital video cameras for video stabilization in captured video sequences, as a software module, hardware module, or a combination thereof.

FIG. 5 illustrates an example video stabilization module 500, and data flow and processing within the module 500, according to at least some embodiments. FIG. 12 illustrates an example computer system on which embodiments of module 500 may be implemented. Referring to FIG. 5, an input vide sequence 550 may be obtained. At 502, a feature tracking technique may be applied to estimate 2-D feature trajectories 552 from the input video 550. At 504, a video partitioning technique may be applied to segment the video sequence 550 into factorization windows and transition windows. At 506, the feature trajectories 552 may be smoothed by applying smoothing techniques to the factorization windows and transition windows, as described in the sections titled Factorization window stabilization techniques and Transition window stabilization techniques, to generate smoothed trajectories 554. At 508, the input video sequence 550 may be warped with the guidance of the new feature trajectories 562 according to the warping techniques described in the section titled Determining and applying warping models to generate as output a warped, stabilized video sequence 556. At 510, the frames in video sequence 556 may then be cropped according to the cropping technique described in the section titled Cropping technique.

While FIG. 5 shows the warping technique 508 as part of the video stabilization module 500, in some embodiments the warping technique 508 may be implemented external to module 500, for example as a separate video image frame warping module that accepts smoothed feature trajectories 554 and input video sequence 550 as input. Similarly, cropping technique 510 may be implemented as a separate module, or in a separate warping module.

FIG. 6 illustrates an example video stabilization module that may implement the video stabilization methods as illustrated in FIGS. 1 through 5 and 7 through 11. FIG. 12 illustrates an example computer system on which embodiments of module 600 may be implemented. Module 600 receives as input a video sequence 610. In some embodiments, module 600 may receive user input 612 via user interface 602 specifying one or more video stabilization parameters as previously described, for example to select between smoothing motion and no motion modes, to change the underlying motion model used in stabilization, to set parameters or weights that control the degree of smoothness or other parameters of the smoothing techniques, and so on. Module 600 then applies a robust video stabilization technique as described herein, according to user input 612 received via user interface 602, if any. Module 600 generates as output a stabilized and cropped output video sequence 620. Output video sequence 620 may, for example, be stored to a storage medium 640, such as system memory, a disk drive, DVD, CD, etc. Output video sequence 620 may, in addition or instead, be displayed to a display device 650. Output video sequence 620 may, in addition or instead, be provided to one or more other video processing modules 660 for further processing.

Example System

Embodiments of a video stabilization module and/or of the video stabilization techniques as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the video stabilization methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a video stabilization module are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., a processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, configured to implement embodiments of a video stabilization module as described herein, and data storage 2035, comprising various data accessible by program instructions 2025. In one embodiment, program instructions 2025 may include software elements of embodiments of a video stabilization module as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of a video stabilization module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a digital video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
 performing, by one or more processors:
  obtaining a sequence of warped frames from a video sequence, the warped frames being warped according to a video stabilization technique;
  determining a canvas that incorporates all of the warped frames, and for each warped frame:
   placing the warped frame into the canvas with a portion of the canvas not covered by the warped frame;
   determining a maximum bounding box for the warped frame, the maximum bounding box not overlapping the portion of the canvas not covered by the warped frame;
   determining an anchor point at the warped frame according to the maximum bounding box for the warped frame;
  temporally smoothing the anchor points for the warped frames by applying a bilateral filter, limited to an area containing the anchor point, to an array containing the anchor points in temporal order; and
  cropping the warped frames according to the anchor points to generate cropped frames.

2. The method as recited in claim 1, wherein the canvas is determined as a union of all meshes of the warped frames.

3. The method as recited in claim 1, wherein said determining the maximum bounding box for each warped frame comprises:
 initializing a length of edges of a bounding box for the respective warped frame to a minimum value; and
 iteratively increasing the length of the edges until all of the edges have reached the portion of the canvas not covered by the warped frame, wherein only the length of edges that have not reached the portion of the canvas not covered by the warped frame are increased at a given iteration.

4. The method as recited in claim 1, wherein said determining an anchor point at each warped frame according to the maximum bounding box for the respective warped frame comprises determining a center of the maximum bounding box for the respective warped frame as the anchor point for the respective frame.

5. The method as recited in claim 1, wherein said temporally smoothing the anchor points for the warped frames shifts the location of at least one anchor point.

6. The method as recited in claim 1, wherein the bilateral filter is separately applied to X and Y coordinates of the anchor points.

7. The method as recited in claim 1, wherein the video stabilization technique partitions an input video sequence into one or more factorization windows and one or more transition windows according to two-dimensional (2D) feature trajectories in the video sequence, applies a factorization window stabilization technique to each of the one or more factorization windows, applies a transition window stabilization technique to each of the one or more transition windows, and applies one or more warping models to the warped frames in the video sequence according to the smoothed feature trajectories to generate a stabilized video sequence.

8. A system, comprising:
at least one processor to implement a video stabilization module as executable instructions, the video stabilization module configured to:
obtain a sequence of warped frames from a video sequence, the warped frames being warped according to a video stabilization technique;
determine a canvas that incorporates all of the warped frames, and for each warped frame:
place the warped frame into the canvas with a portion of the canvas not covered by the warped frame;
determine a maximum bounding box for the warped frame, the maximum bounding box not overlapping the portion of the canvas not covered by the warped frame;
determine an anchor point at the warped frame according to the maximum bounding box for the warped frame;
temporally smooth the anchor points for the warped frames by application of a bilateral filter, limited to an area containing the anchor point, to an array containing the anchor points in temporal order; and
crop the warped frames according to the anchor points to generate cropped frames.

9. The system as recited in claim 8, wherein the canvas is determined as a union of all meshes of the warped frames.

10. The system as recited in claim 8, wherein, to determine the maximum bounding box for each warped frame, the video stabilization module is configured to:
initialize a length of edges of a bounding box for the respective warped frame to a minimum value; and
iteratively increase the length of the edges until all of the edges have reached the portion of the canvas not covered by the warped frame, wherein only the length of edges that have not reached the portion of the canvas not covered by the warped frame are increased at a given iteration.

11. The system as recited in claim 8, wherein the video stabilization module is configured to determine a center of the maximum bounding box for a respective warped frame as the anchor point for the respective frame.

12. The system as recited in claim 8, wherein the bilateral filter is applied separately to X and Y coordinates of the anchor points.

13. One or more computer-readable storage memory devices comprising stored instructions that are computer-executable to implement:
obtaining a sequence of warped frames from a video sequence, the warped frames being warped according to a video stabilization technique;
determining a canvas that incorporates all of the warped frames, and for each warped frame:
placing the warped frame into the canvas with a portion of the canvas not covered by the warped frame;
determining a maximum bounding box for the warped frame, the maximum bounding box not overlapping the portion of the canvas not covered by the warped frame;
determining an anchor point at the warped frame according to the maximum bounding box for the warped frame;
temporally smoothing the anchor points for the warped frames by applying a bilateral filter, limited to an area containing the anchor point, to an array containing the anchor points in temporal order; and
cropping the warped frames according to the anchor points to generate cropped frames.

14. The one or more computer-readable storage memory devices as recited in claim 13, wherein the canvas is determined as a union of all meshes of the warped frames.

15. The one or more computer-readable storage memory devices as recited in claim 13, wherein said determining the maximum bounding box for each warped frame comprises the instructions further computer-executable to implement:
initializing a length of edges of a bounding box for the respective warped frame to a minimum value; and
iteratively increasing the length of the edges until all of the edges have reached the portion of the canvas not covered by the warped frame, wherein only the length of edges that have not reached the portion of the canvas not covered by the warped frame are increased at a given iteration.

16. The one or more computer-readable storage memory devices as recited in claim 13, wherein said determining an anchor point at each warped frame according to the maximum bounding box for the respective warped frame comprises the instructions further computer-executable to implement determining a center of the maximum bounding box for the respective warped frame as the anchor point for the respective frame.

17. The one or more computer-readable storage memory devices as recited in claim 13, wherein the bilateral filter is applied separately to X and Y coordinates of the anchor points.

18. The system as recited in claim 8, wherein the location of at least one anchor point shifts based on temporally smoothing of the anchor points for the warped frames.

19. The computer-readable storage memory devices as recited in claim 13, wherein said temporally smoothing the anchor points for the warped frames shifts the location of at least one anchor point.

20. The computer-readable storage memory devices as recited in claim 13, wherein the video stabilization technique partitions an input video sequence into one or more factorization windows and one or more transition windows according to two-dimensional (2D) feature trajectories in the video sequence, applies a factorization window stabilization technique to each of the one or more factorization windows, applies a transition window stabilization technique to each of the one or more transition windows, and applies one or more warping models to the frames in the video sequence according to the smoothed feature trajectories to generate a stabilized video sequence.

* * * * *